United States Patent
Hattori et al.

(10) Patent No.: US 8,249,781 B2
(45) Date of Patent: Aug. 21, 2012

(54) VEHICLE SEAT CONTROL SYSTEM AND METHOD

(75) Inventors: Koji Hattori, Toyota (JP); Naoki Okada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 381 days.

(21) Appl. No.: 12/514,597

(22) PCT Filed: Nov. 12, 2007

(86) PCT No.: PCT/IB2007/003445
§ 371 (c)(1),
(2), (4) Date: May 13, 2009

(87) PCT Pub. No.: WO2008/059338
PCT Pub. Date: May 22, 2008

(65) Prior Publication Data
US 2010/0030435 A1 Feb. 4, 2010

(30) Foreign Application Priority Data
Nov. 17, 2006 (JP) .................................. 2006-311225

(51) Int. Cl.
*B60R 22/00* (2006.01)
*B62K 1/00* (2006.01)

(52) U.S. Cl. .......................................... 701/49; 280/266
(58) Field of Classification Search ........................ None
See application file for complete search history.

(56) References Cited

U.S. PATENT DOCUMENTS

| | | | | |
|---|---|---|---|---|
| 5,004,967 A * | 4/1991 | Ogasawara | ................ | 318/568.1 |
| 5,097,185 A * | 3/1992 | Ogasawara | ................... | 318/268 |
| 5,185,562 A * | 2/1993 | Huyer | ........................... | 318/466 |
| 5,204,592 A * | 4/1993 | Huyer | ........................... | 318/466 |
| 5,592,171 A * | 1/1997 | Jordan | ........................ | 342/26 D |
| 6,943,516 B2 * | 9/2005 | Woller et al. | ................. | 318/466 |
| 7,237,847 B2 * | 7/2007 | Hancock et al. | ......... | 297/452.56 |

(Continued)

FOREIGN PATENT DOCUMENTS

DE 42 01 142 A1 8/1992

(Continued)

OTHER PUBLICATIONS

"Notification of Reason for Refusal" in Japanese Patent Application No. 2006-311225, filed Nov. 17, 2006 (Drafting date: Sep. 8, 2008).

*Primary Examiner* — Thomas Tarcza
*Assistant Examiner* — Nagi Murshed
(74) *Attorney, Agent, or Firm* — Finnegan, Henderson, Farabow, Garrett & Dunner, LLP

(57) ABSTRACT

In a vehicle seat control system (10), before a vehicle (60) turns a curve ahead of the vehicle (60), a control circuit (28) determines lateral acceleration that is expected to occur to the vehicle (60) while the vehicle (60) is turning the curve, and in addition, determines whether a braking operation is performed by a driver before the vehicle (60) turns the curve. When the control circuit (28) determines that an estimation value of the lateral acceleration is greater than a reference value, and that a braking operation has been performed by the driver before the vehicle (60) turns the curve, movable side support portions (26) in a vehicle seat (12) are pivoted in the closing or bending direction.

10 Claims, 18 Drawing Sheets

U.S. PATENT DOCUMENTS

| | | | |
|---|---|---|---|
| 7,239,096 B2 * | 7/2007 | Hancock et al. | 318/59 |
| 7,737,653 B2 * | 6/2010 | Carmen et al. | 318/466 |
| 2001/0046926 A1 * | 11/2001 | Adachi et al. | 477/108 |

FOREIGN PATENT DOCUMENTS

| | | |
|---|---|---|
| DE | 198 23 058 A1 | 12/1999 |
| JP | 60-197436 | 10/1985 |
| JP | 5-229373 | 9/1993 |
| JP | 11-2321 | 1/1999 |
| JP | 2000-145937 | 5/2000 |
| JP | 2003-2094 | 1/2003 |
| JP | 2003-532577 | 11/2003 |
| JP | 2004-42792 | 2/2004 |
| WO | WO 01/85487 A1 | 11/2001 |

* cited by examiner

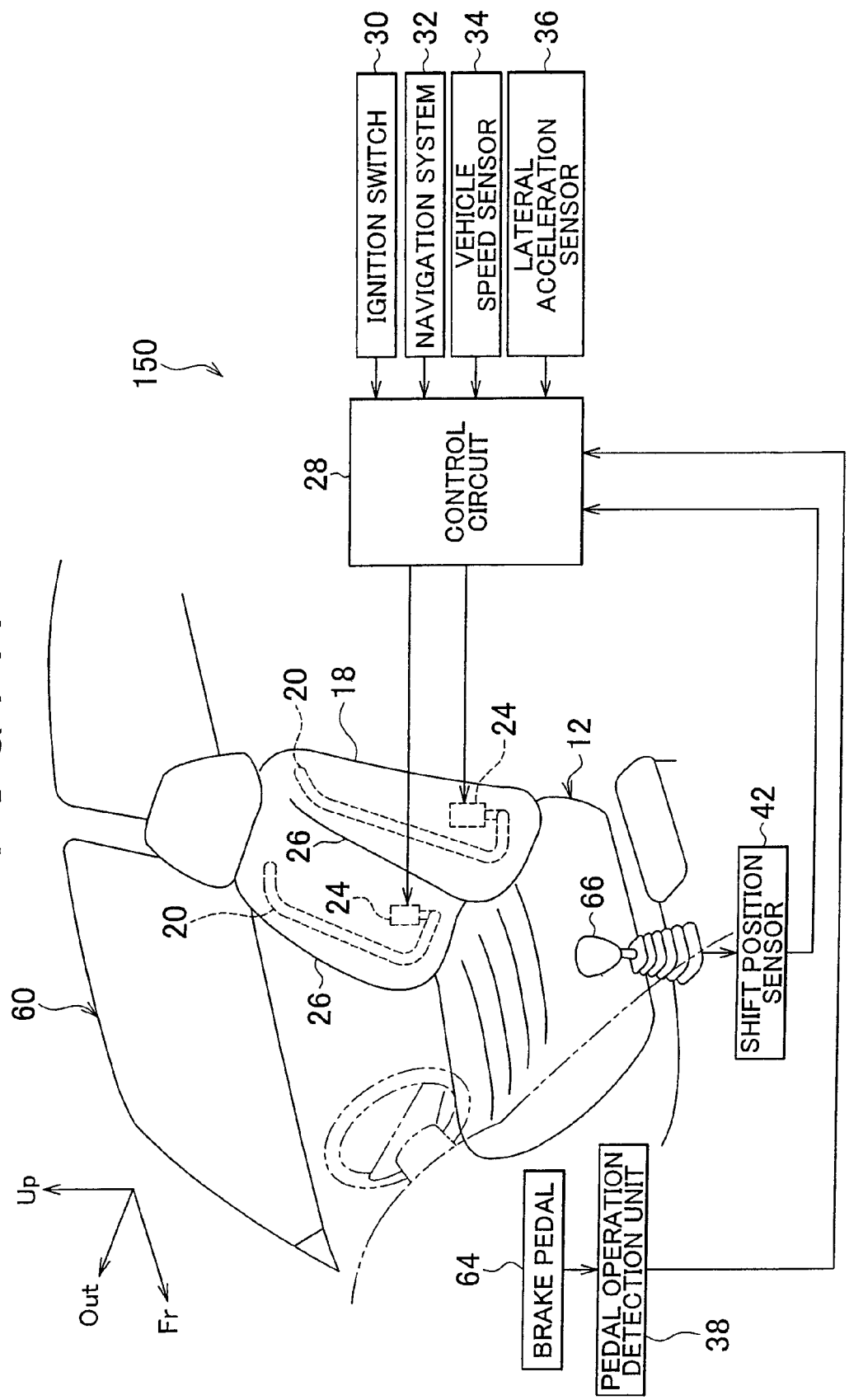

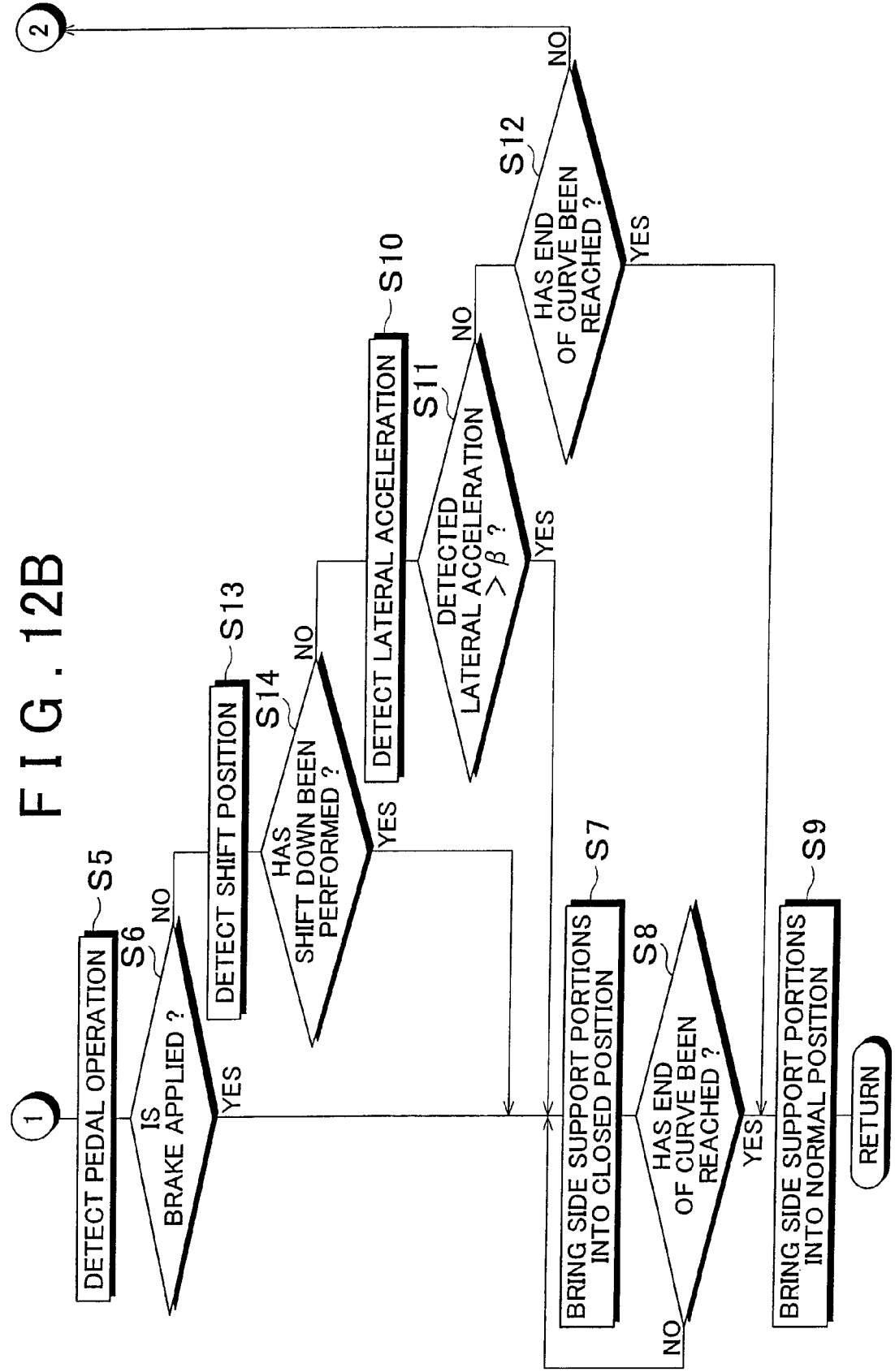

VEHICLE SEAT CONTROL SYSTEM AND METHOD

CROSS-REFERENCE TO RELATED APPLICATIONS

This application is a national phase application of International Application No. PCT/IB2007/003445, filed Nov. 12, 2007, and claims the priority of Japanese Application No. 2006-311225, filed Nov. 17, 2006, the contents of both of which are incorporated herein by reference.

FIELD OF THE INVENTION

The invention relates to a vehicle seat control system and method. More specifically, the invention relates to a vehicle seat control system and method configured to be able to vary the degree of restraint on a seated occupant by moving restraint portions of the vehicle seat relative to the seat body portion.

BACKGROUND OF THE INVENTION

Vehicle seat control systems of this kind include those described below. Japanese Patent Application Publication No. 2003-2094 (JP-A-2003-2094) and Japanese Patent Application Publication No. 2003-532577 (JP-A-2003-532577) describe examples of devices in which the degree of support provided by side support portions of a vehicle seat is adjustable. In these examples, lateral acceleration that occurs when a vehicle turns a curve is estimated based on the curvature radius of the curve and the traveling speed of the vehicle, and the degree of support provided by the support portions of the driver's seat is adjusted based on the result of the estimation of the lateral acceleration.

Although, with the examples described in JP-A-2003-2094 and JP-A-2003-532577, it is possible to restrain an occupant by means of the side support portions of the vehicle seat when a vehicle turns a curve, there is a room for improvement in view of the purpose to restrain an occupant at a more proper time that the occupant feels appropriate.

DISCLOSURE OF THE INVENTION

An object of the invention is to provide a vehicle seat control system capable of restraining an occupant at a time that the occupant feels appropriate.

A first aspect of the invention relates to a vehicle seat control system. The vehicle seat control system includes: a vehicle seat having a restraint portion that is provided so as to be movable relative to a seat body portion and of which a degree of restraint on a seated occupant is variable; a driving device for moving the restraint portion relative to the seat body portion in an occupant restraining direction; a curvature radius detection system for detecting a curvature radius of a curve ahead on a road on which the vehicle is running; a speed sensing part for sensing a speed of the vehicle; a pre-turning action detection section for detecting a pre-turning action taken before the vehicle turns the curve; an estimation section for estimating lateral acceleration that is expected to occur to the vehicle while the vehicle is turning the curve ahead of the vehicle, based on the curvature radius of the curve ahead of the vehicle that is detected by the curvature radius detection system, and on the speed of the vehicle before the vehicle turns the curve ahead of the vehicle that is detected by the speed sensing part; and a drive control section for controlling the driving device so as to move the restraint portion relative to the seat body portion in the occupant restraining direction when the lateral acceleration of the vehicle that is estimated by the estimation section is greater than a predetermined reference lateral-acceleration value, and the pre-turning action is detected by the pre-turning action detection section.

In this vehicle seat control system, when there is a curve ahead on the road on which the vehicle is running, the curvature radius of the curve ahead of the vehicle is detected by the curvature radius detection system, and the speed of the vehicle before the vehicle turns the curve ahead of the vehicle is sensed by the speed sensing part. The estimation section estimates lateral acceleration that is expected to occur to the vehicle while the vehicle is turning the curve ahead of the vehicle, based on the curvature radius of the curve ahead of the vehicle that is detected by the curvature radius detection system, and on the speed of the vehicle before the vehicle turns the curve ahead of the vehicle that is sensed by the speed sensing part. In addition, before the vehicle turns the curve ahead, the pre-turning action detection section detects a pre-turning action taken before the vehicle turns the curve. When the lateral acceleration of the vehicle that is estimated by the estimation section is greater than a predetermined reference lateral-acceleration value, and the pre-turning action is detected by the pre-turning action detection section, the driving device is controlled by the drive control section so that the restraint portion is moved relative to the seat body portion in the occupant restraining direction.

Thus, with the vehicle seat control system according to the first aspect of the invention, in addition to the lateral acceleration that is expected to occur to the vehicle while the vehicle is turning the curve ahead of the vehicle, whether a pre-turning action is taken before the vehicle turns the curve ahead of the vehicle is determined before the vehicle turns the curve ahead of the vehicle. Depending on the determination results, the restraint portion of the vehicle seat is moved in the occupant restraining direction. Thus, it is possible to restrain the occupant at a more proper time that the occupant feels appropriate as compared to the case where the restraint portion of the vehicle seat is moved in the occupant restraining direction depending only on the result of estimating lateral acceleration.

A second aspect of the invention relates to a vehicle seat control system. The vehicle seat control system includes: a vehicle seat having a restraint portion that is provided so as to be movable relative to a seat body portion and of which a degree of restraint on a seated occupant is variable; a driving device for moving the restraint portion relative to the seat body portion in an occupant restraining direction; a curvature radius detection system for detecting a curvature radius of a curve ahead on a road on which the vehicle is running; a speed sensing part for sensing a speed of the vehicle; a deceleration detection section for detecting deceleration of the vehicle in a vehicle longitudinal direction; a pre-turning action detection section for detecting a pre-turning action taken before the vehicle turns the curve; an estimation section for estimating lateral acceleration that is expected to occur to the vehicle while the vehicle is turning the curve ahead of the vehicle, based on the curvature radius of the curve ahead of the vehicle that is detected by the curvature radius detection system, and on the speed of the vehicle before the vehicle turns the curve ahead of the vehicle that is sensed by the speed sensing part; and a drive control section that controls the driving device so that the restraint portion is moved relative to the seat body portion in the occupant restraining direction when the lateral acceleration of the vehicle estimated by the estimation section is greater than a predetermined reference lateral-acceleration value, the pre-turning action is detected by the pre-turning action detection section, and the deceleration of the vehicle in the vehicle longitudinal direction detected by the deceleration detection section is greater than a predetermined reference deceleration value.

In the vehicle seat control system according to the second aspect of the invention, when there is a curve ahead on the road on which the vehicle is running, the curvature radius of the curve ahead of the vehicle is detected by the curvature radius detection system, and the speed of the vehicle before the vehicle turns the curve ahead of the vehicle is sensed by the speed sensing part. The estimation section estimates lateral acceleration that is expected to occur to the vehicle while the vehicle is turning the curve ahead of the vehicle, based on the curvature radius of the curve ahead of the vehicle that is detected by the curvature radius detection system, and on the speed of the vehicle before the vehicle turns the curve ahead of the vehicle that is sensed by the speed sensing part. In addition, before the vehicle turns the curve ahead, the pre-turning action detection section detects a pre-turning action taken before the vehicle turns the curve, and the deceleration detection section detects the deceleration of the vehicle in the vehicle longitudinal direction that occurs to the vehicle before the vehicle turns the curve ahead of the vehicle. When the lateral acceleration of the vehicle that is estimated by the estimation section is greater than a predetermined reference lateral-acceleration value, the pre-turning action is detected by the pre-turning action detection section, and the deceleration of the vehicle in the vehicle longitudinal direction that is detected by the deceleration detection section is greater than the predetermined reference deceleration value, the driving device is controlled by the drive control section so that the restraint portion is moved relative to the seat body portion in the occupant restraining direction.

Thus, with the vehicle seat control system according to the first aspect of the invention, in addition to the lateral acceleration that is expected to occur to the vehicle while the vehicle is turning the curve ahead of the vehicle, whether a pre-turning action is taken before the vehicle turns the curve ahead of the vehicle and the deceleration of the vehicle in the vehicle longitudinal direction are determined before the vehicle turns the curve ahead of the vehicle. Depending on the determination results, the restraint portion of the vehicle seat is moved in the occupant restraining direction. Thus, it is possible to restrain the occupant at an even more proper time that the occupant feels appropriate as compared to the case where the restraint portion of the vehicle seat is moved in the occupant restraining direction depending only on the result of estimating lateral acceleration.

In the vehicle seat control systems according to the first and second aspects of the invention, the pre-turning action detection section may detect a deceleration operation for decelerating the vehicle as the pre-turning action.

In this vehicle seat control system, before the vehicle turns the curve ahead of the vehicle, the pre-turning action detection section detects a deceleration operation for decelerating the vehicle as the pre-turning action. When a deceleration operation for decelerating the vehicle performed by the occupant is detected by the pre-turning action detection section, the driving device is controlled by the drive control section so that the restraint portion is moved relative to the seat body portion in the occupant restraining direction.

With this vehicle seat control system, it is possible to ensure that the restraint portion of the vehicle seat is moved in the occupant restraining direction before the vehicle turns the curve ahead of the vehicle when the occupant shows the intention to decelerate the vehicle. Thus, it is possible to restrain the occupant at a more proper time that the occupant feels appropriate.

In the vehicle seat control systems according to the first and second aspects of the invention, the pre-turning action detection section may detect a braking operation of the vehicle as the deceleration operation.

In this vehicle seat control system, before the vehicle turns the curve ahead of the vehicle, the pre-turning action detection section detects a braking operation of the vehicle as the deceleration operation for decelerating the vehicle. Thus, it is possible to surely detect the intention to decelerate the vehicle before the vehicle turns the curve ahead of the vehicle.

The pre-turning action detection section may detect a shift down operation of the transmission of the vehicle as the deceleration operation.

In this vehicle seat control system, before the vehicle turns the curve ahead of the vehicle, the pre-turning action detection section detects a shift down operation of the transmission of the vehicle as the deceleration operation for decelerating the vehicle. Thus, it is possible to surely detect the intention to decelerate the vehicle before the vehicle turns the curve ahead of the vehicle.

The pre-turning action detection section detects, as the pre-turning action, a visual recognition action taken when the occupant or a driver visually recognizes the curve ahead of the vehicle.

In this vehicle seat control system, before the vehicle turns the curve ahead of the vehicle, the pre-turning action detection section detects, as the pre-turning action, a visual recognition action taken when the occupant or a driver visually recognizes the curve ahead of the vehicle. When the visual recognition action taken when the occupant or a driver visually recognizes the curve ahead of the vehicle is detected by the pre-turning action detection section, the driving device is controlled by the drive control section so that the restraint portion is moved relative to the seat body portion in the occupant restraining direction.

With this vehicle seat control system, it is possible to surely move the restraint portion of the vehicle seat in the occupant restraining direction when the occupant or a driver visually recognizes the curve ahead of the vehicle before the vehicle turns the curve ahead of the vehicle. Thus, it is possible to restrain the occupant at a more proper time that the occupant feels appropriate.

A third aspect of the invention relates to a vehicle seat control system. The vehicle seat control system includes: a vehicle seat having a restraint portion that is provided so as to be movable relative to a seat body portion and of which a degree of restraint on a seated occupant is variable; a driving device for moving the restraint portion relative to the seat body portion in an occupant restraining direction; a curvature radius detection system for detecting a curvature radius of a curve ahead on a road on which the vehicle is running; a speed sensing part for sensing a speed of the vehicle; a shift down detection section for detecting an event that a transmission of the vehicle is shifted down by a shifting device; an estimation section for estimating lateral acceleration that is expected to occur to the vehicle while the vehicle is turning the curve ahead of the vehicle, based on the curvature radius of the curve ahead of the vehicle that is detected by the curvature radius detection system, and on the speed of the vehicle before the vehicle turns the curve ahead of the vehicle that is sensed by the speed sensing part; and a drive control section for controlling the driving device so as to move the restraint portion relative to the seat body portion in the occupant restraining direction when the lateral acceleration of the vehicle that is estimated by the estimation section is greater than a predetermined reference lateral-acceleration value, and the event that the transmission is shifted down is detected based on a result of detection performed by the shift down detection section.

In this vehicle seat control system, when there is a curve ahead on the road on which the vehicle is running, the curvature radius of the curve ahead of the vehicle is detected by the curvature radius detection system, and the speed of the vehicle before the vehicle turns the curve ahead of the vehicle is sensed by the speed sensing part. The estimation section estimates lateral acceleration that is expected to occur to the vehicle while the vehicle is turning the curve ahead of the vehicle, based on the curvature radius of the curve ahead of the vehicle that is detected by the curvature radius detection system, and on the speed of the vehicle before the vehicle turns the curve ahead of the vehicle that is sensed by the speed sensing part. The shift down detection section detects a shift down of a transmission of the vehicle before the vehicle turns the curve. When the lateral acceleration of the vehicle that is estimated by the estimation section is greater than a predetermined reference lateral-acceleration value, and it is detected that the transmission is shifted down based on the result of detection performed by the shift down detection section, the driving device is controlled by the drive control section so that the restraint portion is moved relative to the seat body portion in the occupant restraining direction.

With this vehicle seat control system, in addition to the lateral acceleration that is expected to occur to the vehicle while the vehicle is turning the curve ahead of the vehicle, whether the transmission is shifted down is determined before the vehicle turns the curve ahead of the vehicle. Depending on the determination results, the restraint portion of the vehicle seat is moved in the occupant restraining direction. Thus, it is possible to restrain the occupant at a more proper time that the occupant feels appropriate as compared to the case where the restraint portion of the vehicle seat is moved in the occupant restraining direction depending only on the result of estimating lateral acceleration.

In the vehicle seat control system according to the third aspect of the invention, the shifting device may include: a distance detection section for detecting a distance between a vehicle position on the road on which the vehicle is running and the curve ahead of the vehicle; an automatic transmission system capable of shifting down the transmission; a determination section for determining whether it is required to shift down the transmission, based on the distance detected by the distance detection section, the curvature radius of the curve ahead of the vehicle that is detected by the curvature radius detection system, and the speed of the vehicle before the vehicle turns the curve ahead of the vehicle that is detected by the speed sensing part; and an automatic shift control section for controlling the automatic transmission system to shift down the transmission when the determination section determines that it is required to shift down the transmission.

In this vehicle seat control system, when there is a curve ahead on the road on which the vehicle is running, the distance detection section detects the distance between the vehicle position on the road on which the vehicle is running and the curve ahead of the vehicle. The determination section determines whether it is required to shift down the transmission, based on the distance detected by the distance detection section, on the curvature radius of the curve ahead of the vehicle that is detected by the curvature radius detection system, and on the speed of the vehicle before the vehicle turns the curve ahead of the vehicle that is sensed by the speed sensing part. When it is determined by the determination section that it is required to shift down the transmission, the automatic transmission system is controlled by the automatic shift control section, so that the transmission is shifted down.

With the vehicle seat control system, when it is determined that it is required to shift down the transmission before the vehicle turns the curve ahead of the vehicle, it is possible to automatically shift down the transmission by means of the shifting device without the need for the occupant to perform a particular operation.

The vehicle seat control system according to the third aspect of the invention may further include a deceleration detection section for detecting deceleration of the vehicle in the vehicle longitudinal direction. In the vehicle seat control system, the drive control section may control the driving device so that the restraint portion is moved relative to the seat body portion in the occupant restraining direction when the lateral acceleration of the vehicle estimated by the estimation section is greater than the predetermined reference lateral-acceleration value, the event that the transmission is shifted down is detected based on a result of detection performed by the shift down detection section, and the deceleration of the vehicle in the vehicle longitudinal direction detected by the deceleration detection section is greater than a predetermined reference deceleration value.

A fourth aspect of the invention relates to a vehicle seat control method, and more specifically, to a method of controlling a vehicle seat having a restraint portion that is provided so as to be movable relative to a seat body portion and of which a degree of restraint on a seated occupant is variable. The vehicle seat control method includes the steps of: moving the restraint portion relative to the seat body portion in an occupant restraining direction; detecting a curvature radius of a curve ahead on a road on which the vehicle is running; sensing a speed of the vehicle; detecting a pre-turning action taken before the vehicle turns the curve; estimating lateral acceleration that is expected to occur to the vehicle while the vehicle is turning the curve ahead of the vehicle, based on the detected curvature radius of the curve ahead of the vehicle, and on the sensed speed of the vehicle before the vehicle turns the curve ahead of the vehicle; and moving the restraint portion relative to the seat body portion in the occupant restraining direction when the estimated lateral acceleration of the vehicle is greater than a predetermined reference lateral-acceleration value, and the pre-turning action is detected.

A fifth aspect of the invention relates to a vehicle seat control method, and more specifically, to a method of controlling a vehicle seat having a restraint portion that is provided so as to be movable relative to a seat body portion and of which a degree of restraint on a seated occupant is variable. The vehicle seat control method includes the steps of: moving the restraint portion relative to the seat body portion in an occupant restraining direction; detecting a curvature radius of a curve ahead on a road on which the vehicle is running; sensing a speed of the vehicle; detecting an event that a transmission of the vehicle is shifted down by a shifting device; estimating lateral acceleration that is expected to occur to the vehicle while the vehicle is turning the curve ahead of the vehicle, based on the detected curvature radius of the curve ahead of the vehicle, and on the sensed speed of the vehicle before the vehicle turns the curve ahead of the vehicle; and moving the restraint portion relative to the seat body portion in the occupant restraining direction when the estimated lateral acceleration of the vehicle is greater than a predetermined reference lateral-acceleration value, and the event that the transmission is shifted down is detected.

As described in detail above, with the invention, it is possible to restrain an occupant at a more proper time that the occupant feels appropriate as compared to the case where a restraint portion of a vehicle seat is moved in the occupant restraining direction depending only on the result of estimating lateral acceleration.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein:

FIG. 11 is a block diagram showing an overall configuration of a vehicle seat control system according to a fifth embodiment of the invention;

FIGS. 12A and 12B are flow chart illustrating operation of the vehicle seat control system according to the fifth embodiment of the invention;

DETAILED DESCRIPTION OF EMBODIMENTS

Referring to FIGS. 1 to 4, a first embodiment of the invention will be described below.

Figure 1:
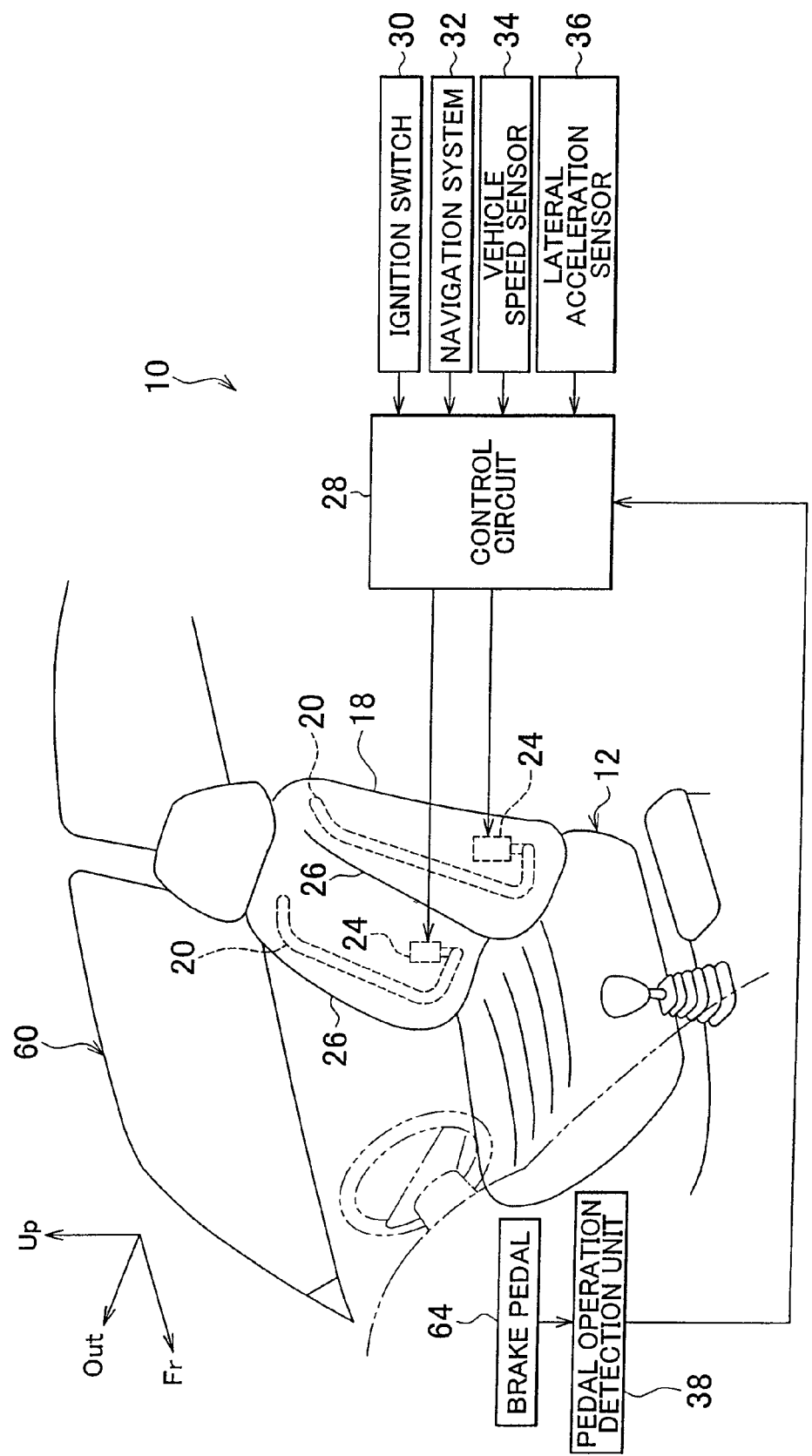
FIG. 1 is a block diagram showing an overall configuration of a vehicle seat control system according to a first embodiment of the invention.
Figure 2:
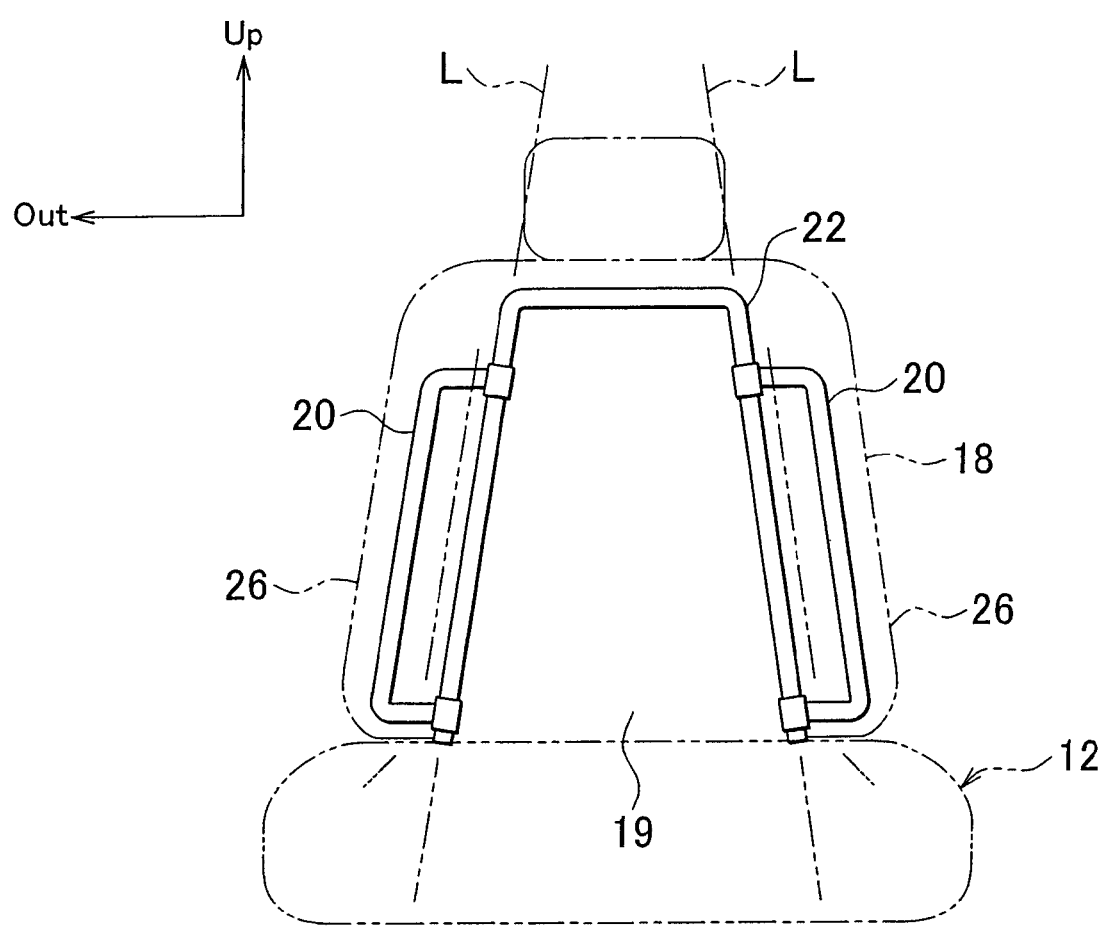
FIG. 2 is a front view of a vehicle seat with which the vehicle seat control system according to the first embodiment of the invention is provided.
Figure 3:
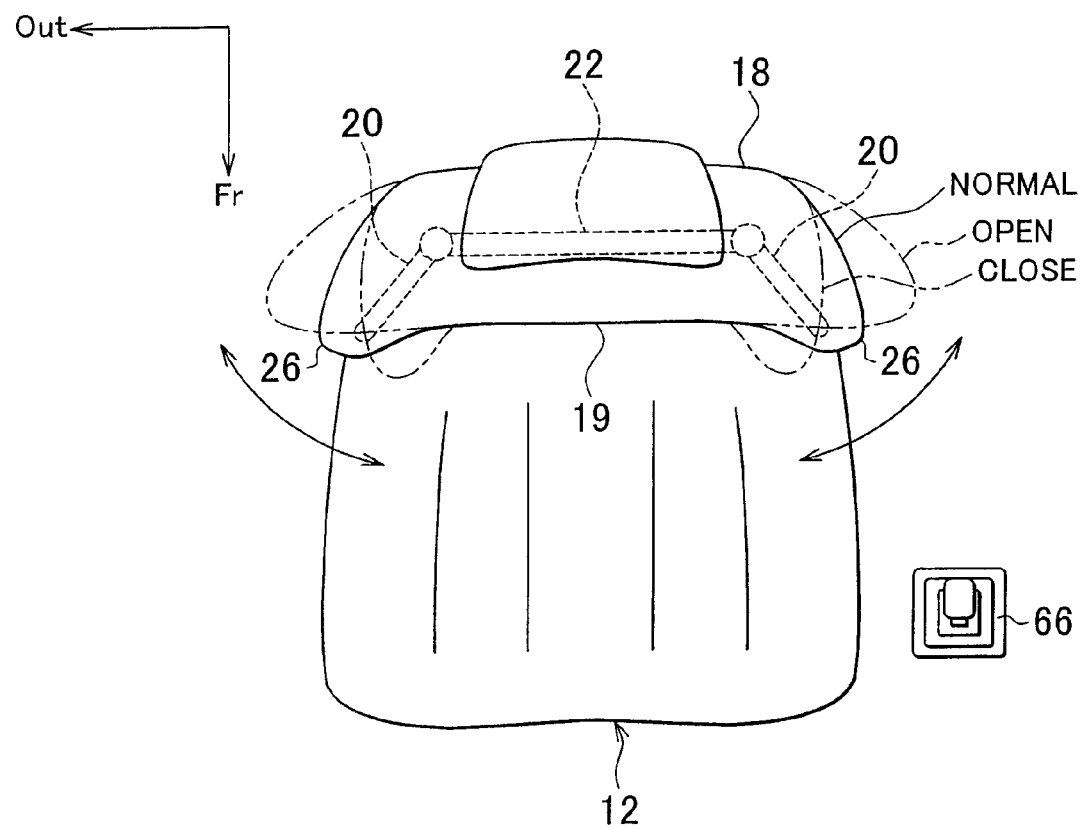
FIG. 3 is a plan view for explaining operation of the vehicle seat with which the vehicle seat control system according to the first embodiment of the invention is provided.
Figure 4:
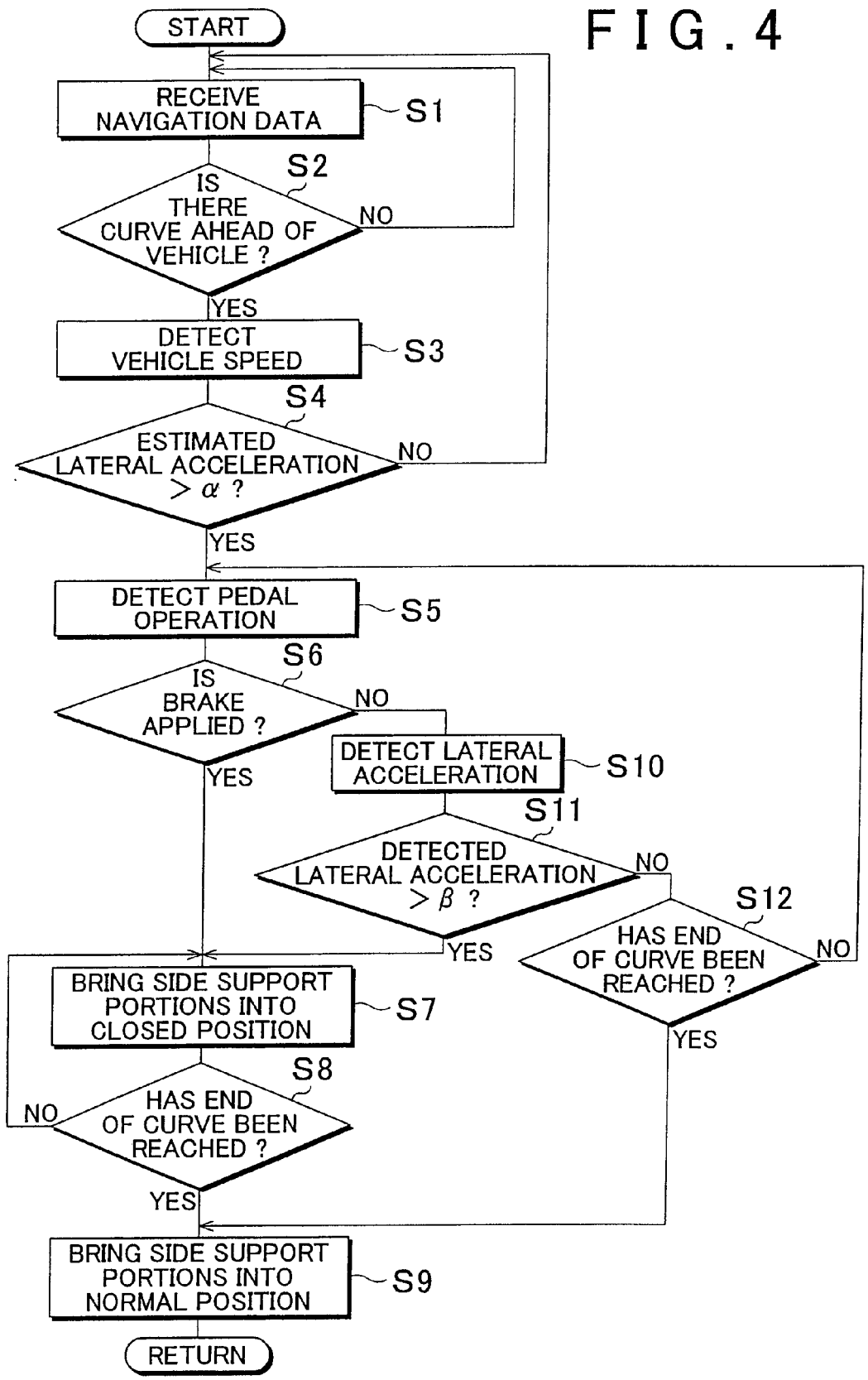
FIG. 4 is a flow chart illustrating operation of the vehicle seat control system according to the first embodiment of the invention.

FIG. 1 shows a block diagram showing an overall configuration of a vehicle seat control system 10 according to the first embodiment of the invention. FIG. 2 shows a front view of a vehicle seat 12 with which the vehicle seat control system 10 according to the first embodiment of the invention is provided. FIG. 3 shows, in a plan view, a diagram for explaining operation of the vehicle seat 12 with which the vehicle seat control system 10 according to the first embodiment of the invention is provided. FIG. 4 shows a flow chart illustrating operation of the vehicle seat control system 10 according to the first embodiment of the invention. In FIGS. 1 to 3, the arrows Fr, Out, and Up indicate the longitudinally forward direction with respect to the vehicle, the widthwise outward direction with respect to the vehicle, and the vertically upward direction with respect to the vehicle.

As shown in FIG. 1, in the vehicle seat control system 10 according to the first embodiment, the vehicle seat 12 is provided as a driver's seat of a vehicle 60. The vehicle seat 12 is provided with a seat back 18. In each side portion of the seat back 18, a side frame 20 that is formed to extend in a vertical direction of the side portion is installed.

As shown in FIG. 2, upper and lower end portions of the side frames 20 are connected to a main frame 22, which is installed in the seat back 18, at upper and lower end portions of the main frame 22 so that each of the side frames 20 can rotate about the imaginary axis L extending in a substantially vertical direction with respect to the vehicle. In addition, in the seat back 18 of the vehicle seat 12, as shown in FIG. 1, a pair of drive motors 24 (driving devices) are installed, and the side frames 20 are configured to be rotated by the drive motors 24. Both side portions of the seat back 18 are used as movable side support portions 26 (restraint portions) that open and close relative to a seat back center portion 19 (seat body portion) as the side frames 20 pivot.

The movable side support portions 26 are provided for the seat back center portion 19 so that the movable side support portions 26 can take a normal position as shown by the solid line in FIG. 3, a closed position as shown by the phantom line L1 (chain line) in FIG. 3, and an open position as shown by the phantom line L2 (chain double-dashed line) in FIG. 3. When the movable side support portions 26 take the closed position as shown by the phantom line L1 (chain line) in FIG. 3, the degree of restraint on the seated driver is the highest. When the movable side support portions 26 take the open position as shown by the phantom line L2 (chain double-dashed line) in FIG. 3, the degree of restraint on the seated driver is the lowest.

As shown in FIG. 1, the vehicle seat control system 10 of this embodiment has a configuration in which a control circuit 28 is provided at an appropriate location in the vehicle 60, and in which an ignition switch 30, a navigation system 32 (curvature radius detection system), a vehicle speed sensor 34 (speed sensing part), a lateral acceleration sensor 36, and a pedal operation detection unit 38 (pre-turning action detection section) are connected to the control circuit 28.

The ignition switch 30 is designed to output an engine start-up signal to the control circuit 28 when an engine starting operation part (an ignition key or an engine starting button, for example) provided in the vehicle 60 is operated to initiate an engine start, and the ignition switch 30 is also designed to output an engine stop signal to the control circuit 28 when the engine starting operation part is operated to shut down the engine.

The navigation system 32 stores the data concerning roads, such as curves of the roads and the curvature radii of the curves. In addition, the navigation system 32 is designed to be able to calculate or find the data concerning whether there is a curve ahead on the road on which the vehicle is running from the above-mentioned stored data concerning the road that has been stored in advance, and, when there is a curve ahead on the road, calculate or find the data concerning the curvature radius, the length of the curve and the like, based on the data concerning the position of the host vehicle externally supplied from GPS satellites, for example, and then output the data to the control circuit 28.

The vehicle speed sensor 34 is configured to be able to generate a pulse signal corresponding to the traveling speed of the vehicle 60, and is designed to be able to output the pulse signal to the control circuit 28, for example.

The lateral acceleration sensor 36 is configured to be able to generate a signal corresponding to the acceleration that occurs to the vehicle in the vehicle width direction, and is designed to be able to output the signal to the control circuit 28, for example.

The pedal operation detection unit 38 is configured so that it is in an off state when a brake pedal 64 provided in the vehicle 60 is not depressed by a driver, and that, when the brake pedal 64 is depressed, the pedal operation detection unit 38 is turned on. In addition, the pedal operation detection unit 38 is designed to be able to output, to the control circuit 28, a signal corresponding to the on or off state of the switch.

The control circuit 28 is an electric circuit including a CPU, a ROM, and a RAM, and is configured to receive the data output from the above-described navigation system 32, and the signals output from the vehicle speed sensor 34, the lateral acceleration sensor 36, and the pedal operation detection unit 38, and to operate the drive motors 24. Operation of the control circuit 28 will be described in detail below.

Next, operation of the vehicle seat control system 10 according to the first embodiment of the invention will be described.

When a driver operates the engine starting operation part (an ignition key or an engine starting button, for example) provided in the vehicle 60, the ignition switch 30 outputs the engine start-up signal to the control circuit 28. When receiving the engine start-up signal output from the ignition switch 30, the control circuit 28 starts a programmed process shown in FIG. 4. When the programmed process shown in FIG. 4 is started, the movable side support portions 26 take the normal position.

When starting the programmed process shown in FIG. 4, the control circuit 28 first receives the data output from the navigation system 32 (step S1). The control circuit 28 then determines whether there is a curve ahead on the road on which the vehicle 60 is running, based on the data output from the above-described navigation system 32 (step S2).

When there is no curve ahead of the vehicle, such as when the vehicle 60 is running on a straight road, the data indicating that there is a curve ahead on the road on which the vehicle 60 is running is not output from the navigation system 32 to the control circuit 28. In this case, the control circuit 28 therefore determines that there is no curve ahead on the road on which the vehicle 60 is running (NO in step S2), and returns to the process of step S1. The control circuit 28 then repeatedly performs the processes of steps S1 and S2 until determining that there is a curve ahead on the road on which the vehicle 60 is running, based on the data output from the navigation system 32.

On the other hand, when the vehicle 60 approaches a curve ahead of the vehicle as the vehicle 60 travels, the data indicating that there is a curve ahead on the road on which the vehicle 60 is running is output from the navigation system 32 to the control circuit 28. Thus, in the process of step S2 performed during the repetition of the processes of steps S1 to S2, the control circuit 28 determines that there is a curve ahead on the road on which the vehicle 60 is running, based on the data output from the navigation system 32 (YES in step S2).

Subsequently, the control circuit 28 detects the speed of the vehicle 60 before the vehicle 60 turns the curve by detecting the pulse signal output from the vehicle speed sensor 34 (step S3). Thereafter, the control circuit 28 estimates the value of the lateral acceleration that is expected to occur to the vehicle 60 while the vehicle 60 is turning the curve ahead of the vehicle, based on the data concerning the curvature radius of the curve ahead of the vehicle that the control circuit 28 receives in step S1 described above, and on the speed of the vehicle 60 before the vehicle 60 turns the curve ahead of the vehicle that is detected in step S3. The control circuit 28 then determines whether the estimation value of the lateral acceleration is greater than a predetermined reference value $\alpha$ (step S4).

When the curvature radius of the curve ahead of the vehicle 60 is large, and/or when the speed of the vehicle 60 before the vehicle 60 turns the curve is low, for example, the estimation value of the lateral acceleration that is expected to occur to the vehicle 60 while the vehicle 60 is turning the curve ahead of the vehicle is low. In this case, the control circuit 28 therefore determines that the estimation value of the lateral acceleration that is expected to occur to the vehicle 60 while the vehicle 60 is turning the curve ahead of the vehicle is equal to or less than the predetermined reference value $\alpha$ (NO in step S4). The control circuit 28 then returns to the process of step S1.

On the other hand, when the curvature radius of the curve ahead of the vehicle 60 is small, and/or when the speed of the vehicle 60 before the vehicle 60 turns the curve is high, for example, the estimation value of the lateral acceleration that is expected to occur to the vehicle 60 while the vehicle 60 is turning the curve ahead of the vehicle is high. In this case, the control circuit 28 therefore determines that the estimation value of the lateral acceleration that is expected to occur to the vehicle 60 while the vehicle 60 is turning the curve ahead of the vehicle is greater than the predetermined reference value $\alpha$ (YES in step S4). In this embodiment, the process of step S4 performed by the control circuit 28 may be regarded as the estimation section of the invention.

The control circuit 28 then detects the signal output from the pedal operation detection unit 38 (step S5), and determines whether a switch-on signal is output from the pedal operation detection unit 38, that is, whether the brake pedal 64 is depressed to apply the brake (step S6).

When the curvature radius of the curve ahead of the vehicle 60 is small, and/or when the speed of the vehicle 60 before the vehicle 60 turns the curve is high, a driver generally depresses the brake pedal 64 to apply the brake before the vehicle 60 turns the curve to decelerate the vehicle 60. When a driver depresses the brake pedal 64 to apply the brake before the vehicle 60 turns a curve to decelerate the vehicle 60, the control circuit 28 determines that the brake pedal 64 is depressed and the brake is applied (YES in step S6). The control circuit 28 then operates the drive motors 24 to bring the movable side support portions 26 into a closed position by pivoting them in the closing or bending direction (driver restraining direction) (step S7).

In this way, with the vehicle seat control system 10 according to the first embodiment of the invention, in the case where the curvature radius of the curve ahead of the vehicle 60 is small, and/or where the speed of the vehicle 60 before the vehicle 60 turns the curve is high, for example, when a driver depresses the brake pedal 64 to apply the brake before the vehicle 60 turns the curve, the movable side support portions 26 are pivoted in the closing or bending direction to restrain the driver in preparation for turning the curve. In this embodiment, the process of step S7 performed by the control circuit 28 may be regarded as the drive control section according to the invention.

Subsequently, the control circuit 28 determines whether the vehicle 60 has passed the curve (the end of the curve has been reached) (step S8). In this process, the control circuit 28 determines whether the vehicle 60 has passed the curve (the end of the curve has been reached), based on, for example, the data concerning the length of the curve received from the navigation system 32 in step S1, and the travel distance of the vehicle obtained using an odometer (not shown). The control circuit 28 may determine whether the vehicle 60 has passed the curve (the end of the curve has been reached), based on the host vehicle position data newly output from the navigation system 32, for example.

When the control circuit 28 determines that the vehicle 60 has not passed the curve yet (the end of the curve has not been reached yet) (NO in step S8), the control circuit 28 returns to step S7. On the other hand, when the control circuit 28 determines that the vehicle 60 has passed the curve (the end of the curve has been reached) (YES in step S8), the control circuit 28 operates the drive motors 24 to pivot the movable side support portions 26 in the opening or stretching direction to bring them into the original (normal) position (step S9).

In this way, in the vehicle seat control system 10 according to the first embodiment of the invention, when the movable side support portions 26 are pivoted in the closing or bending direction to restrain a driver in preparation for turning the curve, and the vehicle 60 has then passed the curve, the movable side support portions 26 return to the original (normal) position to ensure a comfortable sitting position for the driver.

The above description has been made for the case where it is determined that the estimation value of the lateral acceleration that is expected to occur to the vehicle 60 while the vehicle 60 is turning the curve ahead of the vehicle 60 is greater than the predetermined reference value $\alpha$ (YES in step S4), and the driver depresses the brake pedal 64 to apply the brake to decelerate the vehicle 60 before the vehicle 60 turns the curve (YES in step S6). If the driver does not depress the brake pedal 64 before the vehicle 60 turns the curve, however, operation is performed as described below.

Specifically, if the driver does not depress the brake pedal 64 even when the estimation value of the lateral acceleration that is expected to occur to the vehicle 60 while the vehicle 60 is turning the curve ahead of the vehicle is greater than the predetermined reference value $\alpha$ (YES in step S4), the control circuit 28 receives the signal output from the lateral acceleration sensor 36 to detect lateral acceleration (step S10). The control circuit 28 then determines whether the detection value of the lateral acceleration is greater than a predetermined reference value $\beta$ (step S11).

Even in the case where a driver does not depress the brake pedal 64 before the vehicle 60 turns a curve, when the curvature radius of the curve that the vehicle 60 turns is small, and/or when the speed of the vehicle 60 is high when the vehicle 60 turns the curve, for example, the value of the lateral acceleration that occurs while the vehicle 60 is turning the curve is large in general. In this case, the control circuit 28 therefore determines that the detection value of the lateral acceleration that occurs while the vehicle 60 is turning the curve is greater than the predetermined reference value $\beta$ (YES in step S11). In this case, the control circuit 28 operates the drive motors 24 to pivot the movable side support portions 26 in the closing or bending direction to bring them into a closed position (step S7).

In this way, in the vehicle seat control system 10 according to the first embodiment of the invention, even in the case where a driver does not depress the brake pedal 64 before the vehicle 60 turns a curve, when the value of the lateral acceleration that occurs while the vehicle is turning the curve is greater than the predetermined reference value $\beta$, the movable side support portions 26 are pivoted in the closing or bending direction to restrain the driver.

When the control circuit 28 determines that the brake pedal 64 is not depressed by the driver (NO in step S6), and that the detection value of the lateral acceleration that occurs while the vehicle is turning the curve is equal to or less than the predetermined reference value $\beta$ (NO in step S11), the control circuit 28 determines whether the vehicle 60 has passed the curve (the end of the curve has been reached) (step S12) as in the case of step S8 described above. When the control circuit 28 determines that the vehicle 60 has not passed the curve yet (the end of the curve has not been reached yet) (NO in step S12), the control circuit 28 returns to step S5. When the control circuit 28 determines that the vehicle 60 has passed the curve (the end of the curve has been reached) (YES in step S12), the control circuit 28 maintains the movable side support portions 26 in the as-is (normal) position (step S9).

In the case where, although it is determined that the estimation value of the lateral acceleration that is expected to occur to the vehicle 60 while the vehicle 60 is turning a curve ahead of the vehicle 60 is greater than the predetermined reference value $\alpha$ (YES in step S4), the driver does not depress the brake pedal 64 before the vehicle 60 turns the curve, and the vehicle 60 turns the curve without any deceleration operation, and thereafter, the driver depresses the brake pedal 64 to apply the brake to decelerate the vehicle 60 while the vehicle is turning the curve, the control circuit 28 determines that the brake pedal 64 is depressed to apply the brake, in the process of step S6 performed during the repetition of the processes of steps S5, S6, and S10 to S12 (YES in step S6). The control circuit 28 then operates the drive motors 24 to pivot the movable side support portions 26 in the closing or bending direction to bring them into a closed position (step S7).

Next, operation and effects of the vehicle seat control system 10 according to the first embodiment of the invention will be described.

As described in detail above, with the vehicle seat control system 10 according to the first embodiment of the invention, before the vehicle 60 turns a curve ahead of the vehicle 60, whether a braking operation is performed by a driver before the vehicle 60 turns the curve is determined (step S6) in addition to the lateral acceleration that is expected to occur to the vehicle 60 while the vehicle 60 is turning the curve ahead of the vehicle 60, and, depending on the determination results, the movable side support portions 26 in the vehicle seat 12 are pivoted in the closing or bending direction. As a result, it is possible to restrain the driver at a more proper time that the driver feels appropriate as compared to the case where the movable side support portions 26 in the vehicle seat 12 are pivoted in the closing or bending direction depending only on the result of estimating lateral acceleration (that is, the result of the process of step S4).

In particular, with the vehicle seat control system 10 according to the first embodiment of the invention, a driver is surely restrained when the driver shows the intention to apply braking, and it is therefore possible to restrain the driver at a more proper time that the driver feels appropriate. In addition, the braking operation that is performed by a driver in preparation for turning a curve, and the pivoting of the movable side support portions 26 in the closing or bending direction are performed at substantially the same time, so that the driver feels a sense of unity with the vehicle 60, and it is therefore possible to improve the drive feeling of the driver.

Next, a modification of the vehicle seat control system 10 according to the first embodiment of the invention will be described.

The above description of the first embodiment has been made for the case where the data concerning whether there is a curve ahead of the vehicle 60 on the road on which the vehicle 60 is running, and, if there is a curve ahead on the road, the data concerning the curvature radius of the curve, for example, are calculated or found in the navigation system 32. However, a modification can be made as described below.

Specifically, the vehicle seat control system may be such that the vehicle 60 is provided with a data input device, which functions as the curvature radius detection system, that is capable of receiving data sent from beacons or the like, and that the data concerning whether there is a curve ahead of the vehicle 60 on the road on which the vehicle 60 is running and the data concerning the curvature radius of the curve, for example, are sent out from the beacons or the like and these data are received and detected by the above data input device.

The vehicle seat control system may be such that a camera and an analyzer, which function as the curvature radius detection system, are provided in a front portion of the vehicle, and that the data concerning whether there is a curve ahead of the vehicle 60 on the road on which the vehicle 60 is running and the data concerning the curvature radius of the curve, for example, are calculated or found in the above analyzer based on the image sent from the camera.

The above description of the first embodiment has been made for the case where a driver is restrained by the vehicle seat 12 provided as the driver's seat. However, the vehicle seat 12 may be provided as the passenger seat, and may be designed to restrain a passenger seated on the passenger seat.

The first embodiment is configured so that the degree of restraint on the driver is varied by pivoting the side support portions 26 in the seat back 18 provided in the vehicle seat 12. However, the vehicle seat control system 10 may be configured so that the degree of restraint on the driver is varied by pivoting the side support portions installed in the seat cushion of the vehicle seat 12, or alternatively that the degree of restraint on the driver is varied by moving other portions of the vehicle seat 12.

Although the first embodiment is configured so that an operation of the brake pedal 64 is detected as the pre-turning action taken by a driver, an operation of the accelerator pedal may be detected as the pre-turning action taken by a driver. In addition, for example, the vehicle seat control system may be configured so that, when a predetermined period of time has passed since a release of the accelerator pedal (OFF operation) was detected, this is considered as an operation performed by the driver in preparation for turning a curve, and, depending on this determination, the movable side support portions 26 are pivoted in the closing or bending direction (the driver restraining direction).

Next, referring to FIGS. 5 and 6, a second embodiment of the invention will be described.

Figure 5:
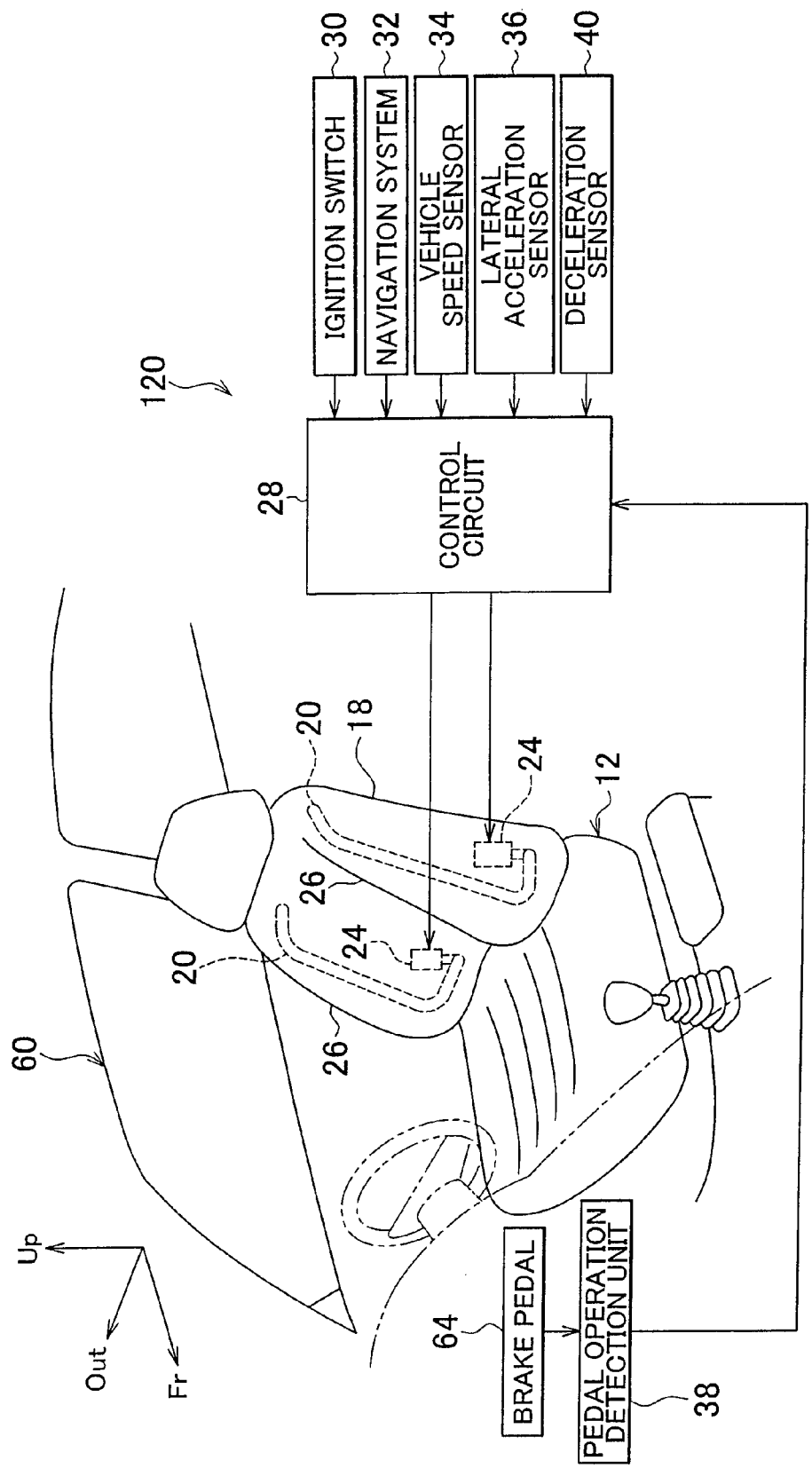
FIG. 5 is a block diagram showing an overall configuration of a vehicle seat control system according to a second embodiment of the invention.

FIG. 5 shows a block diagram showing an overall configuration of a vehicle seat control system 120 according to the second embodiment of the invention. FIG. 6 shows a flow chart illustrating operation of the vehicle seat control system 120 according to the second embodiment of the invention.

Figure 6:
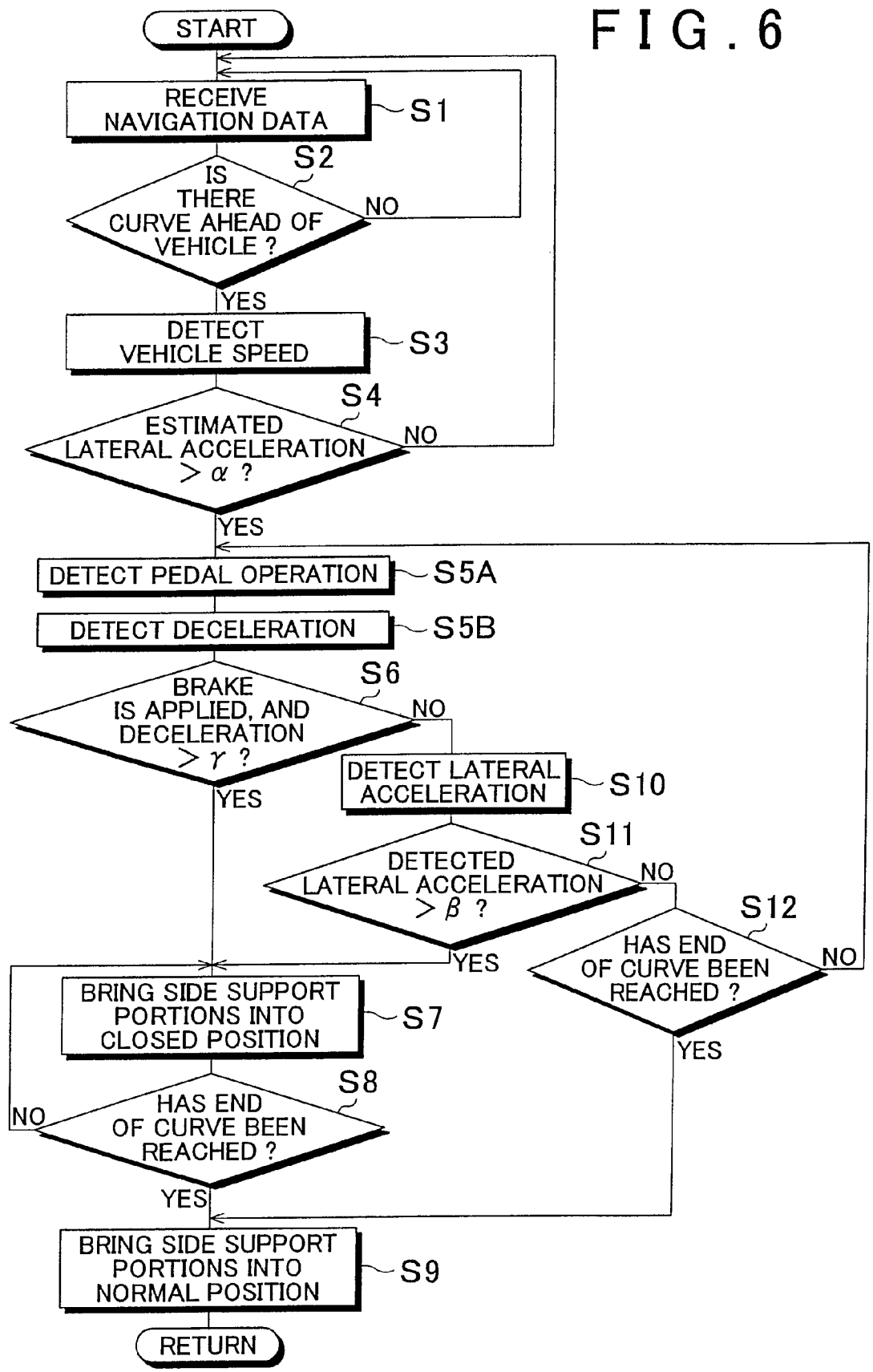
FIG. 6 is a flow chart illustrating operation of the vehicle seat control system according to the second embodiment of the invention.

The vehicle seat control system 120 according to the second embodiment of the invention is such that a deceleration sensor 40 (deceleration detection section) is added to the vehicle seat control system 10 according to the first embodiment of the invention, and that the control circuit 28 is designed to perform a programmed process shown in FIG. 6. Thus, in the second embodiment of the invention, the other components are the same as those of the first embodiment described above. Hence, the same components as those of the first embodiment are designated by the same reference numerals as those of the first embodiment, and description thereof is omitted.

In the vehicle seat control system 120 according to the second embodiment of the invention, the deceleration sensor 40 is configured to be able to generate a signal corresponding to deceleration in the vehicle longitudinal direction that occurs to the vehicle 60, and to output the signal to the control circuit 28.

In the vehicle seat control system 120 according to the second embodiment of the invention, connected to the control circuit 28 are the ignition switch 30, the navigation system 32, the vehicle speed sensor 34, the lateral acceleration sensor 36, the pedal operation detection unit 38, and the deceleration sensor 40. The control circuit 28 is configured to receive data output from the above-described navigation system 32, and the signals output from the vehicle speed sensor 34, the lateral acceleration sensor 36, the pedal operation detection unit 38, and the deceleration sensor 40, and to operate the drive motors 24. Operation of the control circuit 28 will be described in detail later.

Next, operation of the vehicle seat control system 120 according to the second embodiment of the invention will be described.

In the vehicle seat control system 120 according to the second embodiment of the invention, processes of steps S5A and S5B are performed instead of the process of step S5 performed by the vehicle seat control system 10 according to the first embodiment of the invention described above. In addition, the process of step S6 is changed as described below as compared to that performed by the above-described vehicle seat control system 10 according to the first embodiment of the invention. In the vehicle seat control system 120 according to the second embodiment of the invention, the processes other than the processes described below are the same as those of the above-described first embodiment, and therefore, the same processes as those of the first embodiment are designated by the same reference numerals as those of the first embodiment, and description thereof is omitted.

In the vehicle seat control system 120 according to the second embodiment of the invention, when the control circuit 28, before the vehicle 60 turns the curve ahead of the vehicle, determines that the estimation value of the lateral acceleration that is expected to occur to the vehicle 60 while the vehicle 60 is turning the curve ahead of the vehicle 60 is greater than the predetermined reference value a (YES in step S4), the control circuit 28 detects the signal output from the pedal operation detection unit 38 (step S5A). In addition, the control circuit 28 receives the signal output from the deceleration sensor 40, and detects the deceleration in the vehicle longitudinal direction that occurs to the vehicle 60 (step S5B).

Subsequently, the control circuit 28 determines whether a switch-on signal is output from the pedal operation detection unit 38, that is, whether the brake pedal 64 is depressed to apply the brake, and, if the brake pedal 64 is depressed to apply the brake, the control circuit 28 also determines whether the value of the deceleration detected in the above-described step S5B is greater than a predetermined reference value γ (step S6).

When the driver depresses the brake pedal 64 to apply the brake to decelerate the vehicle 60 before the vehicle 60 turns a curve, and the value of the deceleration in the vehicle longitudinal direction that occurs to the vehicle 60 at this time is greater than the predetermined reference value γ, the control circuit 28 determines that the brake pedal 64 is depressed to apply the brake, and the value of the deceleration in the vehicle longitudinal direction that occurs to the vehicle 60 is greater than the predetermined reference value γ (YES in step S6). The control circuit 28 then operates the drive motors 24 to pivot the movable side support portions 26 in the closing or bending direction to bring them into a closed position (step S7).

Thus, in the vehicle seat control system 120 according to the second embodiment of the invention, in the case where the curvature radius of a curve ahead of the vehicle 60 is small, and/or where the speed of the vehicle 60 before the vehicle 60 turns the curve is high, for example, when a driver depresses the brake pedal 64 to apply the brake before the vehicle turns the curve, and the value of the deceleration in the vehicle longitudinal direction that occurs to the vehicle 60 at this time is greater than the predetermined reference value γ, the movable side support portions 26 are pivoted in the closing or bending direction to restrain the driver in preparation for turning the curve.

Next, operation and effects of the vehicle seat control system 120 according to the second embodiment of the invention will be described.

As described in detail above, with the vehicle seat control system 120 according to the second embodiment of the invention, before the vehicle 60 turns a curve ahead of the vehicle 60, whether a braking operation is performed by a driver before the vehicle 60 turns the curve, and the deceleration of the vehicle 60 in the vehicle longitudinal direction are determined (step S6) in addition to the lateral acceleration that is expected to occur to the vehicle 60 while the vehicle 60 is turning the curve ahead of the vehicle 60, and, depending on the determination results, the movable side support portions 26 in the vehicle seat 12 are pivoted in the closing or bending direction. As a result, it is possible to restrain the driver at an even more proper time that the driver feels appropriate as compared to the case where the movable side support portions 26 in the vehicle seat 12 are pivoted in the closing or bending direction depending only on the result of estimating lateral acceleration (that is, the result of the process of step S4).

In particular, with the vehicle seat control system 120 according to the second embodiment of the invention, the movable side support portions 26 in the vehicle seat 12 are not pivoted in the closing or bending direction when a driver merely performs a light braking by putting his/her foot on the brake pedal 64. Specifically, the movable side support portions 26 in the vehicle seat 12 are not pivoted in the closing or bending direction to restrain the driver until the driver operates the brake to cause deceleration of the vehicle 60 in the vehicle longitudinal direction to become large. Thus, the driver feels a greater sense of unity with the vehicle 60, and it is therefore possible to improve the drive feeling of the driver.

Next, a modification of the vehicle seat control system 120 according to the second embodiment of the invention will be described.

In the above second embodiment, the vehicle seat control system is configured so that whether a braking operation is performed by a driver before the vehicle 60 turns a curve, and the deceleration of the vehicle 60 in the vehicle longitudinal direction are determined (step S6), and that the movable side support portions 26 in the vehicle seat 12 are pivoted in the closing or bending direction depending on the determination results. However, the vehicle seat control system may be configured so that, instead of determining the deceleration of the vehicle 60 in the vehicle longitudinal direction in the process of step S6, the amount of depression or the speed of depression of the brake pedal 64 is determined, and, depending on the determination result, the movable side support portions 26 in the vehicle seat 12 are pivoted in the closing or bending direction.

Alternatively, the vehicle seat control system may be configured so that, based only on the result of determining the deceleration of the vehicle 60 in the vehicle longitudinal direction, when it is determined that the deceleration of the vehicle 60 in the vehicle longitudinal direction is greater than the predetermined reference value γ, it is assumed that a brake operation is performed, and it is therefore determined that a pre-turning action has been taken by a driver before the vehicle turns a curve, which causes the movable side support portions 26 in the vehicle seat 12 to be pivoted in the closing or bending direction.

Next, referring to FIGS. 7 and 8, a third embodiment of the invention will be described.

Figure 7:
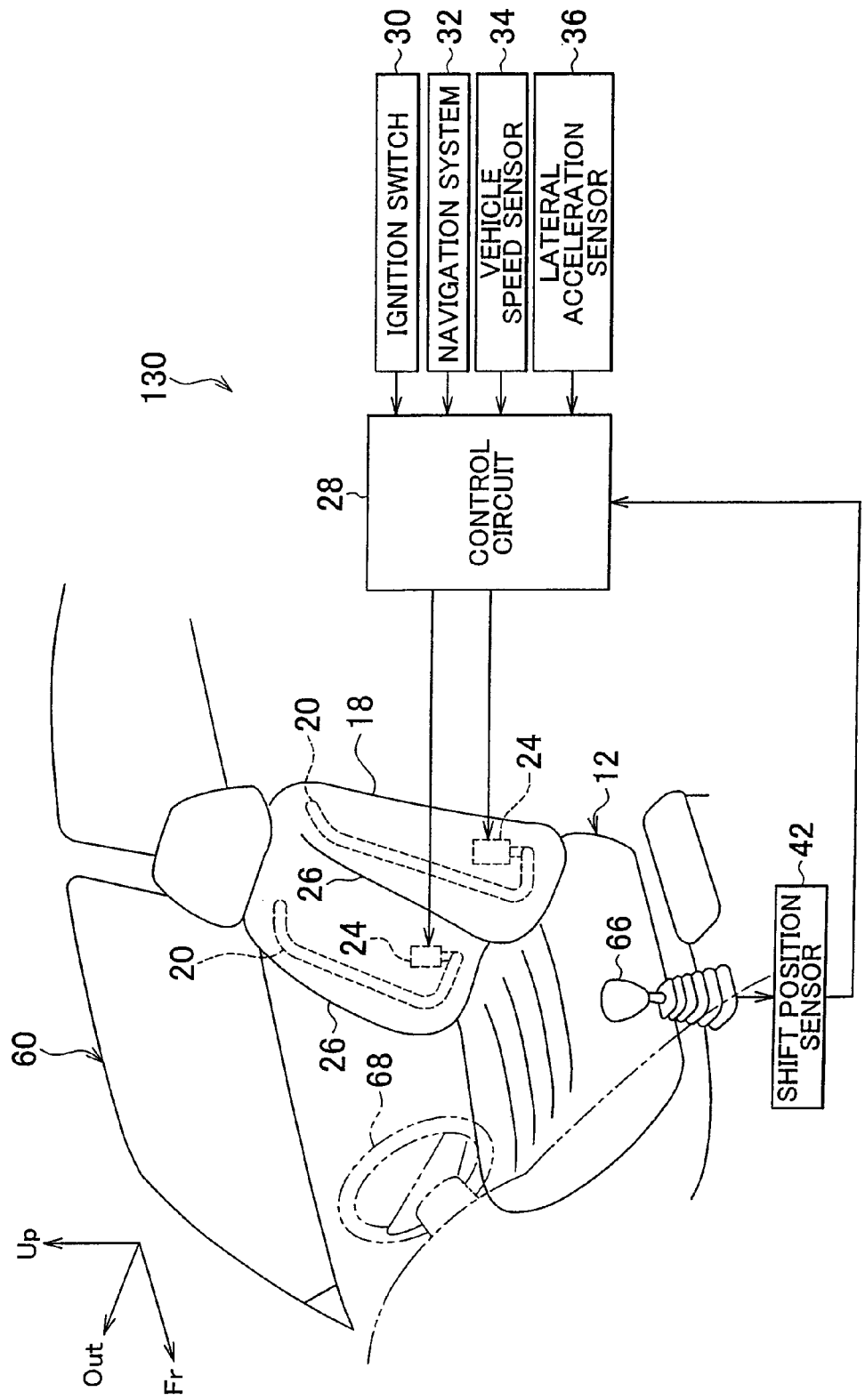
FIG. 7 is a block diagram showing an overall configuration of a vehicle seat control system according to a third embodiment of the invention.

FIG. 7 shows a block diagram showing an overall configuration of a vehicle seat control system 130 according to the third embodiment of the invention. FIG. 8 shows a flow chart illustrating operation of the vehicle seat control system 130 according to the third embodiment of the invention.

Figure 8:
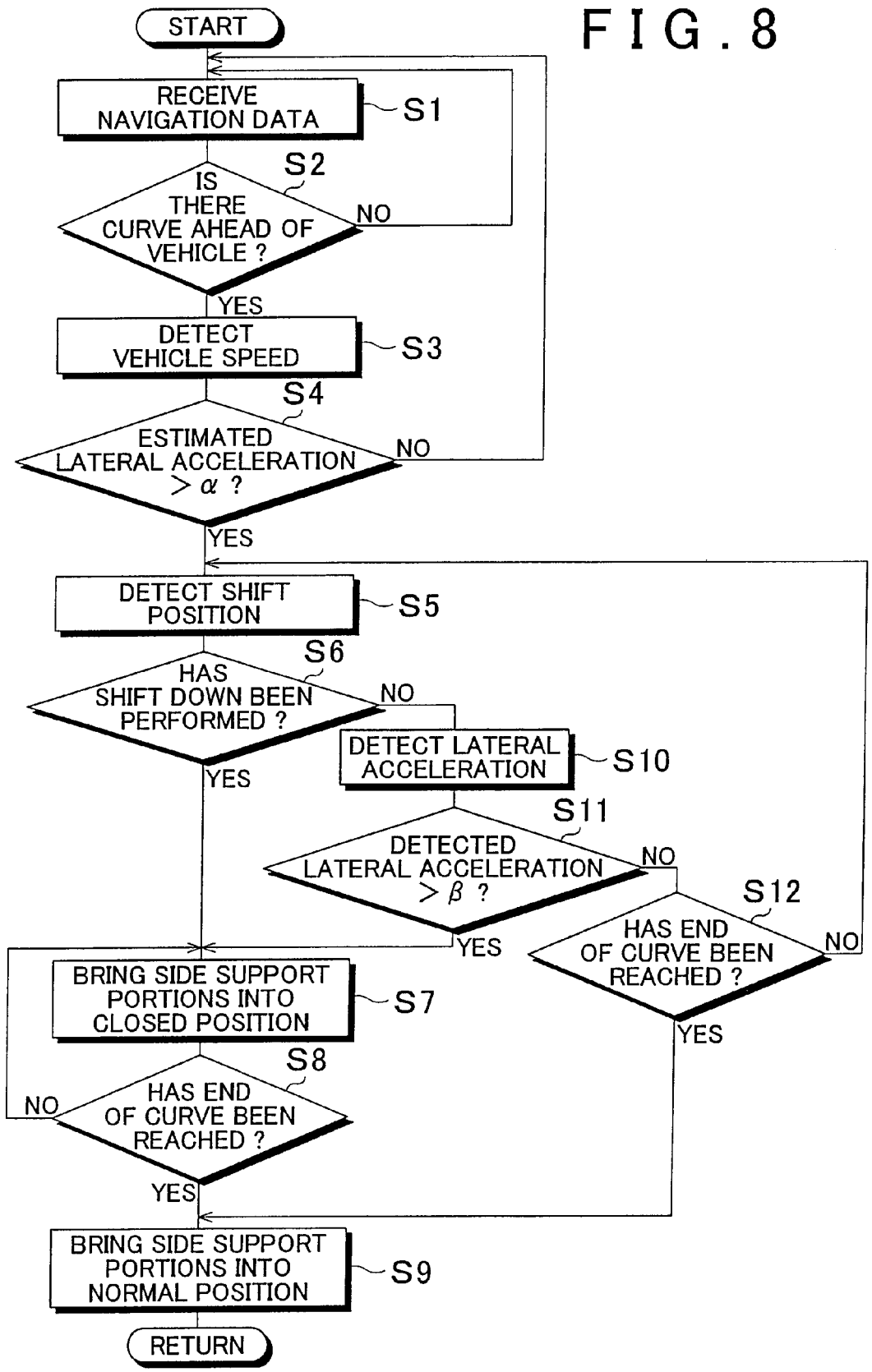
FIG. 8 is a flow chart illustrating operation of the vehicle seat control system according to the third embodiment of the invention.

The vehicle seat control system 130 according to the third embodiment of the invention is such that a shift position sensor 42 (pre-turning action detection section, shift down detection section) is provided instead of the pedal operation detection unit 38 in the vehicle seat control system 10 according to the first embodiment of the invention, and that the control circuit 28 is designed to perform a programmed process shown in FIG. 8. Thus, in the third embodiment of the invention, the other components are the same as those of the first embodiment described above. Hence, the same components as those of the first embodiment are designated by the same reference numerals as those of the first embodiment, and description thereof is omitted.

In the vehicle seat control system 130 according to the third embodiment of the invention, the shift position sensor 42 is configured to be able to generate a signal corresponding to the shift position of a shift lever 66 provided in the vehicle 60, and to output the signal to the control circuit 28. The shift lever 66 is designed to be used to shift a manual transmission.

In the vehicle seat control system 130 according to the third embodiment of the invention, connected to the control circuit 28 are the ignition switch 30, the navigation system 32, the vehicle speed sensor 34, the lateral acceleration sensor 36, and the shift position sensor 42. The control circuit 28 is configured to receive data output from the above-described navigation system 32, and the signals output from the vehicle speed sensor 34, the lateral acceleration sensor 36, and the shift position sensor 42, and to operate the drive motors 24. Operation of the control circuit 28 will be described in detail later.

Next, operation of the vehicle seat control system 130 according to the third embodiment of the invention will be described.

In the vehicle seat control system 130 according to the third embodiment of the invention, the processes of steps S5 and S6 are changed as described below from those performed by the above-described vehicle seat control system 10 according to the first embodiment of the invention. In the vehicle seat control system 130 according to the third embodiment of the invention, the processes other than the processes described below are the same as those of the above-described first embodiment, and therefore, the same processes as those of the first embodiment are designated by the same reference numerals as those of the first embodiment, and description thereof is omitted.

In the vehicle seat control system 130 according to the third embodiment of the invention, when the control circuit 28, before the vehicle 60 turns the curve ahead of the vehicle 60, determines that the estimation value of the lateral acceleration that is expected to occur to the vehicle 60 while the vehicle 60 is turning the curve ahead of the vehicle is greater than the predetermined reference value α (YES in step S4), the control circuit 28 detects the signal output from the shift position sensor 42 (step S5).

Subsequently, the control circuit 28 determines whether a shift down operation of the shift lever 66 is performed by a driver, based on the signal output from the shift position sensor 42 (step S6).

When the driver operates the shift lever 66 for shifting down before the vehicle 60 turns the curve, the control circuit 28 determines that a shift down operation of the shift lever 66 has been performed by the driver, based on the signal output from the shift position sensor 42 (YES in step S6). The control circuit 28 then operates the drive motors 24, and pivots the movable side support portions 26 in the closing or bending direction to bring them into a closed position (step S7).

In this way, with the vehicle seat control system 130 according to the third embodiment of the invention, in the case where the curvature radius of the curve ahead of the vehicle 60 is small, and/or where the speed of the vehicle 60 before the vehicle 60 turns the curve is high, for example, when a driver operates the shift lever 66 for shifting down to decelerate the vehicle 60 before the vehicle 60 turns the curve, the movable side support portions 26 are pivoted in the closing or bending direction to restrain the driver in preparation for turning the curve.

Next, operation and effects of the vehicle seat control system 130 according to the third embodiment of the invention will be described.

As described in detail above, with the vehicle seat control system 130 according to the third embodiment of the invention, before the vehicle 60 turns a curve ahead of the vehicle 60, whether a shift down operation is performed by a driver before the vehicle 60 turns the curve is determined (step S6) in addition to the lateral acceleration that is expected to occur to the vehicle 60 while the vehicle 60 is turning the curve ahead of the vehicle 60, and, depending on the determination results, the movable side support portions 26 in the vehicle seat 12 are pivoted in the closing or bending direction. As a result, it is possible to restrain the driver at a more proper time that the driver feels appropriate as compared to the case where the movable side support portions 26 in the vehicle seat 12 are pivoted in the closing or bending direction depending only on the result of estimating lateral acceleration (that is, the result of the process of step S4).

In particular, with the vehicle seat control system 130 according to the third embodiment of the invention, a driver is surely restrained when the driver shows the intention to perform a shift down operation, and it is therefore possible to restrain the driver at a more proper time that the driver feels appropriate. In addition, the driver is restrained at an earlier time by using a shift down operation performed before a braking operation as a trigger for a pivoting movement of the movable side support portions 26, so that the driver feels an even greater sense of unity with the vehicle 60, and it is therefore possible to improve the drive feeling of the driver.

Next, a modification of the vehicle seat control system 130 according to the third embodiment of the invention will be described.

In the above third embodiment, the vehicle seat control system is configured to detect a shift down operation of the shift lever 66 for shifting the manual transmission, the vehicle seat control system may be configured to detect a shift down operation of the shift lever 66 for shifting an automatic transmission. Alternatively, the vehicle seat control system may be configured to detect a shift down operation of paddle-type levers, switch buttons or the like provided in a steering wheel 68 or the like, instead of detecting a shift down operation of the shift lever 66.

Next, referring to FIGS. 9 and 10, a fourth embodiment of the invention will be described.

Figure 9:
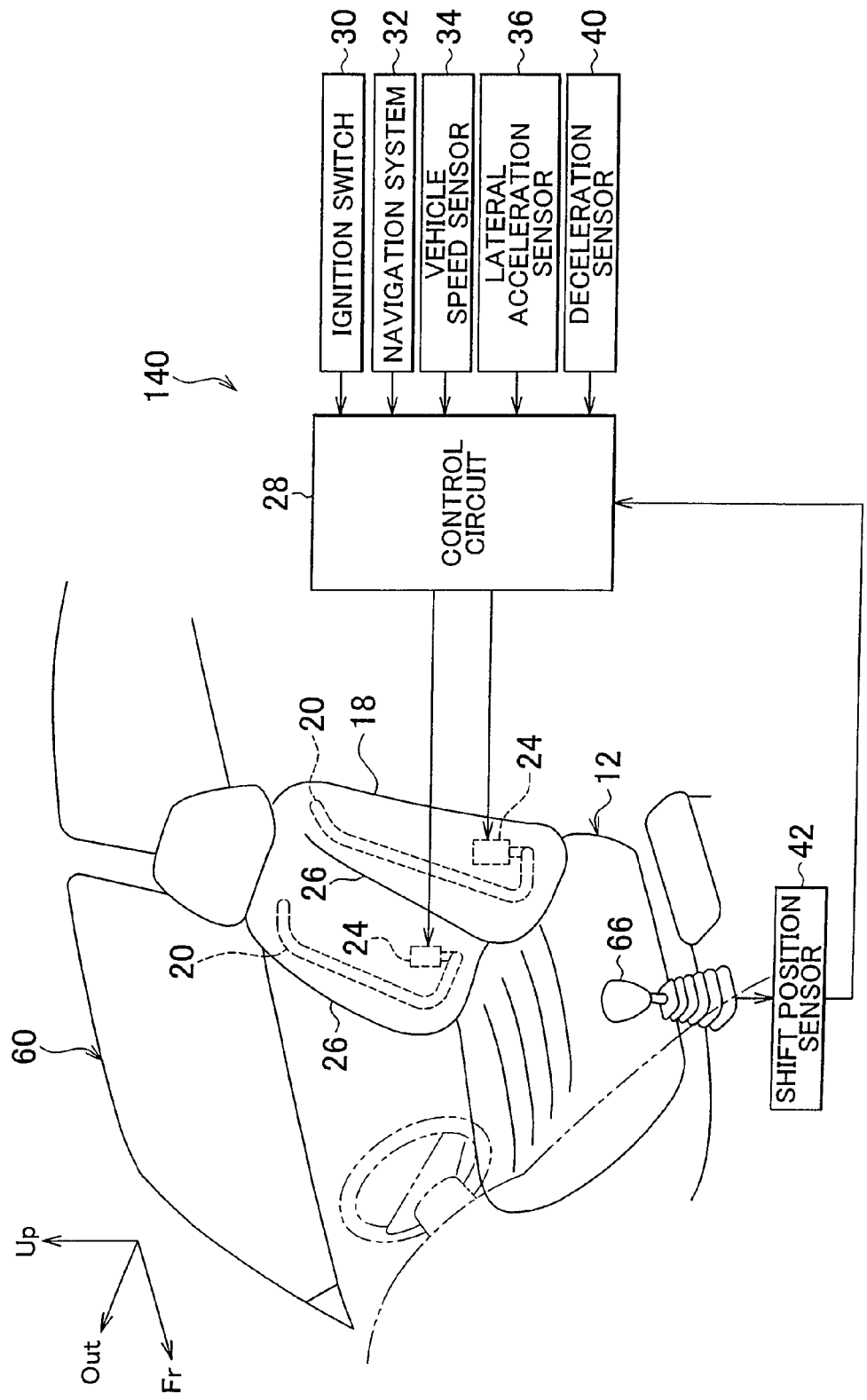
FIG. 9 is a block diagram showing an overall configuration of a vehicle seat control system according to a fourth embodiment of the invention.

FIG. 9 shows a block diagram showing an overall configuration of a vehicle seat control system 140 according to the fourth embodiment of the invention. FIG. 10 shows a flow chart illustrating operation of the vehicle seat control system 140 according to the fourth embodiment of the invention.

Figure 10:
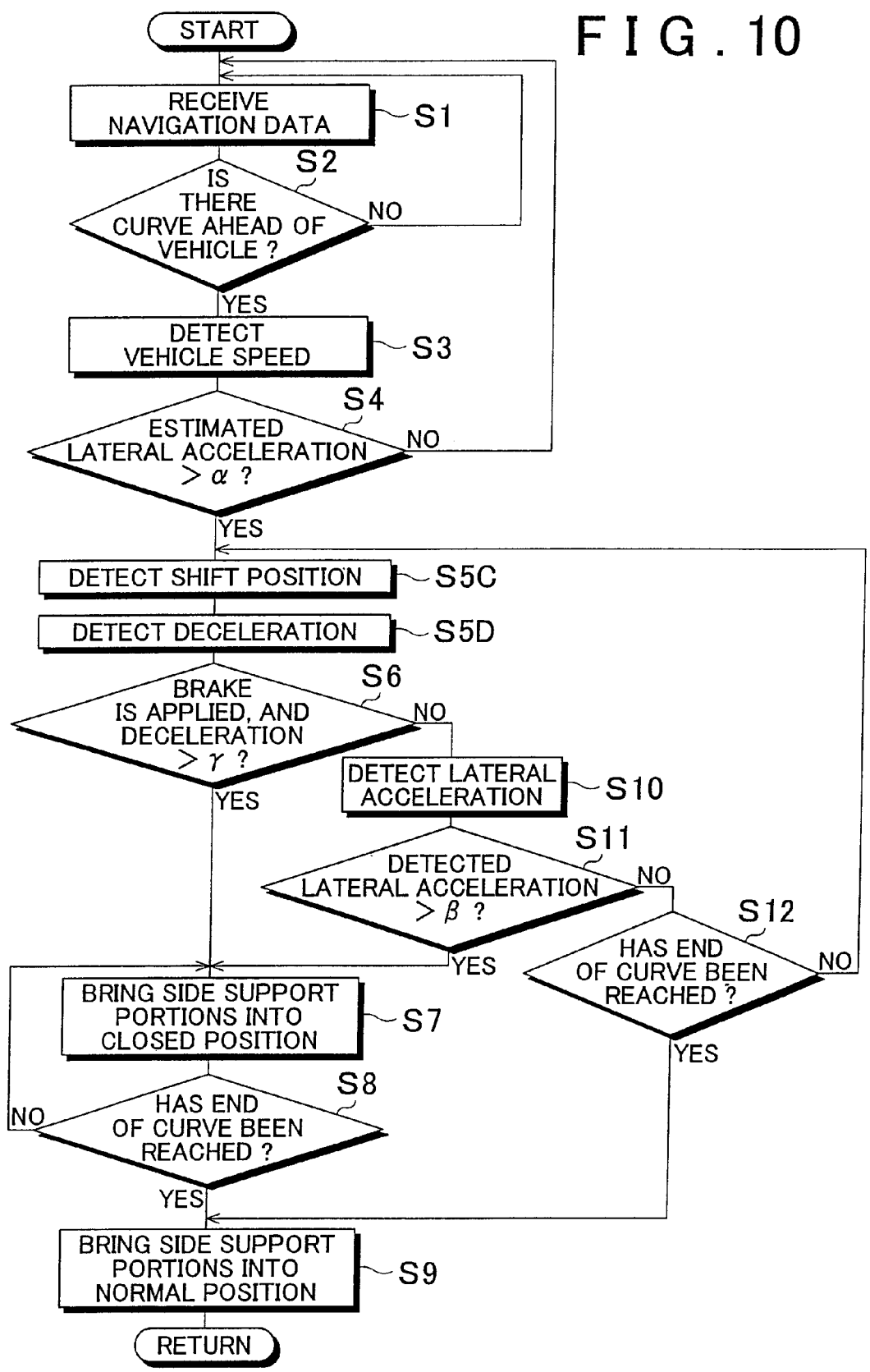
FIG. 10 is a flow chart illustrating operation of the vehicle seat control system according to the fourth embodiment of the invention.

The vehicle seat control system 140 according to the fourth embodiment of the invention is such that a deceleration sensor 40 (deceleration detection section) is added to the vehicle seat control system 130 according to the third embodiment of the invention, and that the control circuit 28 is designed to perform a programmed process shown in FIG. 10. Thus, in the fourth embodiment of the invention, the other components are the same as those of the third embodiment described above. Hence, the same components as those of the third embodiment are designated by the same reference numerals as those of the third embodiment, and description thereof is omitted.

In the vehicle seat control system 140 according to the fourth embodiment of the invention, the same deceleration sensor 40 as that of the above-described second embodiment of the invention is used, and the deceleration sensor 40 is configured to be able to generate a signal corresponding to deceleration in the vehicle longitudinal direction that occurs to the vehicle 60, and to output the signal to the control circuit 28, for example.

In the vehicle seat control system 140 according to the second embodiment of the invention, connected to the control circuit 28 are the ignition switch 30, the navigation system 32, the vehicle speed sensor 34, the lateral acceleration sensor 36, the deceleration sensor 40, and the shift position sensor 42. The control circuit 28 is configured to receive data output from the above-described navigation system 32, and the signals output from the vehicle speed sensor 34, the lateral acceleration sensor 36, the deceleration sensor 40, and the shift position sensor 42, and to operate the drive motors 24. Operation of the control circuit 28 will be described in detail later.

Next, operation of the vehicle seat control system 140 according to the fourth embodiment of the invention will be described.

In the vehicle seat control system 140 according to the fourth embodiment of the invention, processes of steps S5C and S5D are performed instead of the process of step S5 performed by the vehicle seat control system 130 according to the third embodiment of the invention described above. In addition, the process of step S6 is changed as described below as compared to that performed by the above-described vehicle seat control system 130 according to the third embodiment of the invention. In the vehicle seat control system 140 according to the fourth embodiment of the invention, the processes other than the processes described below are the same as those of the above-described first embodiment, and therefore, the same processes as those of the first embodiment are designated by the same reference numerals as those of the first embodiment, and description thereof is omitted.

In the vehicle seat control system 140 according to the fourth embodiment of the invention, when the control circuit 28, before the vehicle 60 turns the curve ahead of the vehicle, determines that the estimation value of the lateral acceleration that is expected to occur to the vehicle 60 while the vehicle 60 is turning the curve ahead of the vehicle 60 is greater than the predetermined reference value α (YES in step S4), the control circuit 28 detects the signal output from the shift position sensor 42 (step S5C). In addition, the control circuit 28 receives the signal output from the deceleration sensor 40, and detects the deceleration in the vehicle longitudinal direction that occurs to the vehicle 60 (step S5D).

Subsequently, the control circuit 28 determines whether a shift down operation of the shift lever 66 is performed by a driver, based on the signal output from the shift position sensor 42, and, if the brake pedal 64 is depressed to apply the brake, the control circuit 28 also determines whether the value of the deceleration detected in the above-described step S5D is greater than a predetermined reference value γ (step S6).

When the driver operates the shift lever 66 for shifting down to decelerate the vehicle 60 before the vehicle 60 turns a curve, and the value of the deceleration in the vehicle longitudinal direction that occurs to the vehicle 60 at this time is greater than the predetermined reference value γ, the control circuit 28 determines that a shift down operation of the shift lever 66 has been performed, and the value of the deceleration in the vehicle longitudinal direction that occurs to the vehicle 60 is greater than the predetermined reference value γ (YES in step S6). The control circuit 28 then operates the drive motors 24 to pivot the movable side support portions 26 in the closing or bending direction to bring them into a closed position (step S7).

Thus, in the vehicle seat control system 140 according to the fourth embodiment of the invention, in the case where the curvature radius of a curve ahead of the vehicle 60 is small, and/or where the speed of the vehicle 60 before the vehicle 60 turns the curve is high, for example, when a driver operates the shift lever 66 for shifting down to decelerate the vehicle 60 before the vehicle 60 turns the curve, and the value of the deceleration in the vehicle longitudinal direction that occurs to the vehicle 60 at this time is greater than the predetermined reference value γ, the movable side support portions 26 are pivoted in the closing or bending direction to restrain the driver in preparation for turning the curve.

Next, operation and effects of the vehicle seat control system 140 according to the fourth embodiment of the invention will be described.

As described in detail above, with the vehicle seat control system 140 according to the fourth embodiment of the invention, before the vehicle 60 turns a curve ahead of the vehicle 60, whether a braking operation is performed by a driver before the vehicle 60 turns the curve is determined (step S6) in addition to the lateral acceleration that is expected to occur to the vehicle 60 while the vehicle 60 is turning the curve ahead of the vehicle 60, and, depending on the determination results, the movable side support portions 26 in the vehicle seat 12 are pivoted in the closing or bending direction. As a result, it is possible to restrain the driver at a more proper time that the driver feels appropriate as compared to the case where the movable side support portions 26 in the vehicle seat 12 are pivoted in the closing or bending direction depending only on the result of estimating lateral acceleration (that is, the result of the process of step S4).

In particular, the movable side support portions 26 in the vehicle seat 12 are not pivoted in the closing or bending direction when a driver merely performs a shift down operation. Specifically, the movable side support portions 26 in the vehicle seat 12 are not pivoted in the closing or bending direction to restrain the driver until the driver performs a shift down operation to cause deceleration of the vehicle 60 in the vehicle longitudinal direction to become large. Thus, the driver feels a greater sense of unity with the vehicle 60, and it is therefore possible to improve the drive feeling of the driver.

Next, referring to FIGS. 11 and 12, a fifth embodiment of the invention will be described.

Figure 12A:
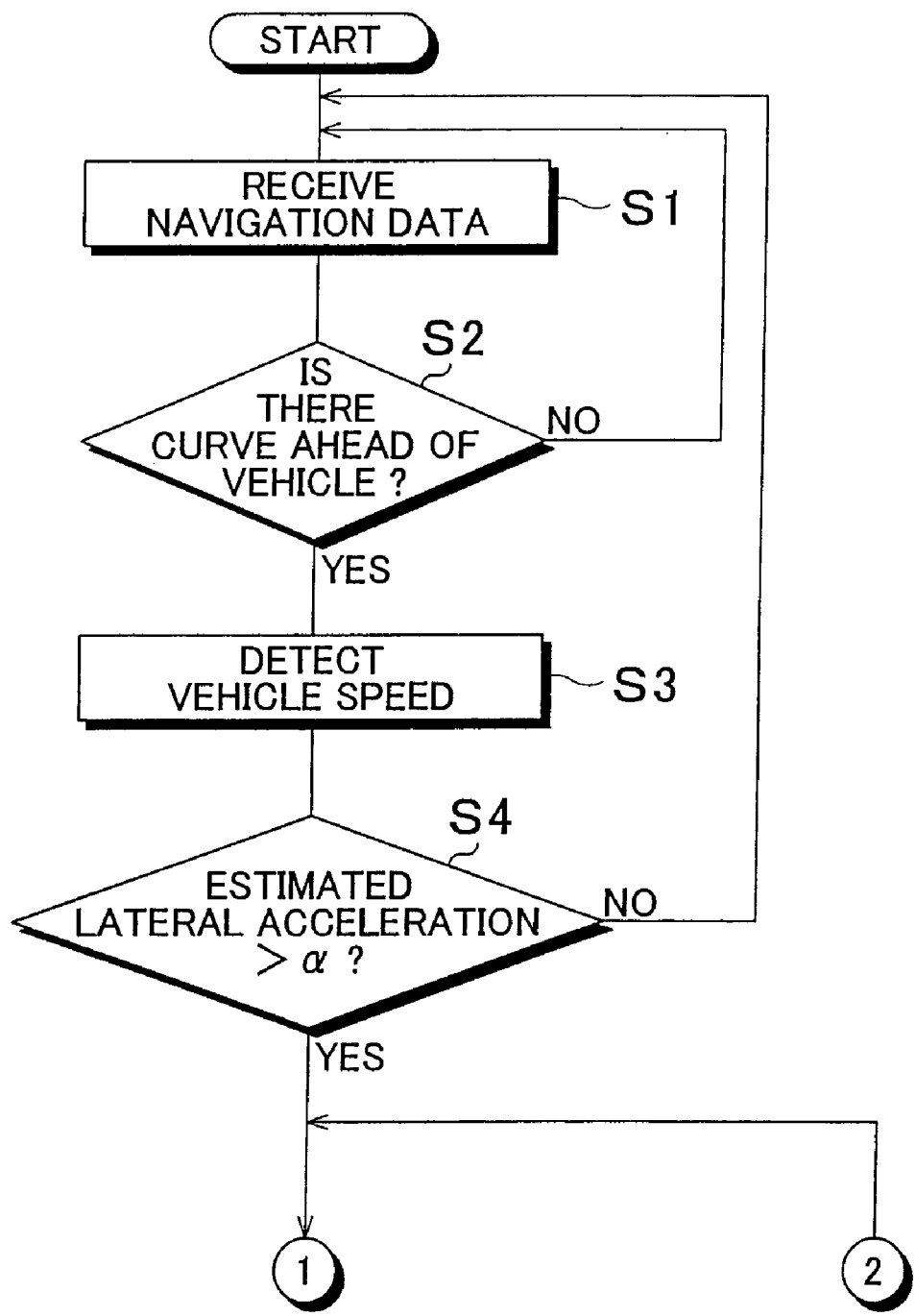

FIG. 11 shows a block diagram showing an overall configuration of a vehicle seat control system 150 according to the fifth embodiment of the invention. FIGS. 12A and 12B shows a flow chart illustrating operation of the vehicle seat control system 150 according to the fifth embodiment of the invention.

The vehicle seat control system 150 according to the fifth embodiment of the invention is such that a shift position sensor 42 (pre-turning action detection section) is added to the vehicle seat control system 10 according to the first embodiment of the invention, and that the control circuit 28 is designed to perform a programmed process shown in FIGS. 12A and 12B. Thus, in the fifth embodiment of the invention, the other components are the same as those of the first embodiment described above. Hence, the same components as those of the first embodiment are designated by the same reference numerals as those of the first embodiment, and description thereof is omitted.

In the vehicle seat control system 150 according to the fifth embodiment of the invention, the same shift position sensor 42 as that of the above-described third embodiment of the invention is used, and the shift position sensor 42 is configured to be able to generate a signal corresponding to the shift position of a shift lever 66 provided in the vehicle 60, and to output the signal to the control circuit 28.

In the vehicle seat control system 150 according to the fifth embodiment of the invention, connected to the control circuit 28 are the ignition switch 30, the navigation system 32, the vehicle speed sensor 34, the lateral acceleration sensor 36, the pedal operation detection unit 38, and the shift position sensor 42. The control circuit 28 is configured to receive data output from the above-described navigation system 32, and the signals output from the vehicle speed sensor 34, the lateral acceleration sensor 36, the deceleration sensor 40, the pedal operation detection unit 38, and the shift position sensor 42, and to operate the drive motors 24. Operation of the control circuit 28 will be described in detail later.

Next, operation of the vehicle seat control system 150 according to the fifth embodiment of the invention will be described.

The vehicle seat control system 150 according to the fifth embodiment of the invention is changed from the above-described vehicle seat control system 10 according to the first embodiment of the invention in that the vehicle seat control system 150 additionally performs processes of steps S13 and S14. In the vehicle seat control system 150 according to the fifth embodiment of the invention, the processes other than the processes described below are the same as those of the above-described first embodiment, and therefore, the same processes as those of the first embodiment are designated by the same reference numerals as those of the first embodiment, and description thereof is omitted.

In the vehicle seat control system 150 according to the fifth embodiment of the invention, when the control circuit 28, before the vehicle 60 turns the curve ahead of the vehicle 60, determines that the estimation value of the lateral acceleration that is expected to occur to the vehicle 60 while the vehicle 60 is turning the curve ahead of the vehicle is greater than the predetermined reference value α (YES in step S4), the control circuit 28 detects the signal output from the pedal operation detection unit 38 (step S5).

Subsequently, the control circuit 28 determines whether a driver depresses the brake pedal 64 to apply the brake, based on the signal output from the pedal operation detection unit 38 (step S6). When the control circuit 28 determines that a driver has depressed the brake pedal 64 to apply the brake based on the signal output from the pedal operation detection unit 38 (YES in step S14), the control circuit 28 operates the drive motors 24 to pivot the movable side support portions 26 in the closing or bending direction to bring them into a closed position (step S7).

On the other hand, when the control circuit 28 determines that the brake pedal 64 is not depressed by the driver based on the signal output from the pedal operation detection unit 38 (NO in step S6), the control circuit 28 detects the signal output from the shift position sensor 42 (step S13).

Subsequently, the control circuit 28 determines whether a shift down operation of the shift lever 66 is performed by a driver, based on the signal output from the shift position sensor 42 (step S14).

When the driver does not operate the shift lever 66 for shifting down before the vehicle 60 turns the curve, the control circuit 28 determines that a shift down operation is not performed by the driver, based on the signal output from the shift position sensor 42 (NO in step S14), and the control circuit 28 receives the signal output from the lateral acceleration sensor 36 to detect lateral acceleration (step S10).

On the other hand, when the driver operates the shift lever 66 for shifting down before the vehicle 60 turns the curve, the control circuit 28 determines that a shift down operation has been performed by the driver, based on the signal output from the shift position sensor 42 (YES in step S14). The control circuit 28 then operates the drive motors 24, and pivots the movable side support portions 26 in the closing or bending direction to bring them into a closed position (step S7).

In this way, with the vehicle seat control system 150 according to the fifth embodiment of the invention, in the case where the curvature radius of the curve ahead of the vehicle 60 is small, and/or where the speed of the vehicle 60 before the vehicle 60 turns the curve is high, for example, when a driver depresses the brake pedal 64 to apply the brake to decelerate the vehicle 60 before the vehicle 60 turns the curve, or when, although the driver does not depress the brake pedal 64 to apply the brake, the driver operates the shift lever 66 for shifting down to decelerate the vehicle 60 before the vehicle 60 turns the curve, the movable side support portions 26 are pivoted in the closing or bending direction to restrain the driver in preparation for turning the curve.

Next, operation and effects of the vehicle seat control system 150 according to the fifth embodiment of the invention will be described.

As described in detail above, with the vehicle seat control system 150 according to the fifth embodiment of the invention, before the vehicle 60 turns a curve ahead of the vehicle 60, whether a braking operation is performed by a driver before the vehicle 60 turns the curve and whether a shift down operation is performed by the driver before the vehicle 60 turns the curve are determined (steps S6 and S14) in addition to the lateral acceleration that is expected to occur to the vehicle 60 while the vehicle 60 is turning the curve ahead of the vehicle 60, and, depending on the determination results, the movable side support portions 26 in the vehicle seat 12 are pivoted in the closing or bending direction. As a result, it is possible to restrain the driver at a more proper time that the driver feels appropriate as compared to the case where the movable side support portions 26 in the vehicle seat 12 are pivoted in the closing or bending direction depending only on the result of estimating lateral acceleration (that is, the result of the process of step S4).

In particular, with the vehicle seat control system 150 according to the fifth embodiment of the invention, a driver is surely restrained when the driver shows the intention to perform a braking operation or a shift down operation, and it is therefore possible to restrain the driver at a more proper time that follows a driving operation of the driver. Thus, the driver feels an even greater sense of unity with the vehicle, and it is therefore possible to improve the drive feeling of the driver.

Next, a modification of the vehicle seat control system 150 according to the fifth embodiment of the invention will be described.

In the above fifth embodiment, the vehicle seat control system is configured so that it determines whether a braking operation of the brake pedal 64 is performed by a driver, and, when a braking operation of the brake pedal 64 is not performed by the driver, the vehicle seat control system subsequently determines whether a shift down operation of the shift lever 66 is performed by the driver. However, the vehicle seat control system may be configured so that it first determines whether a shift down operation of the shift lever 66 is performed by the driver, and, when a shift down operation of the shift lever 66 is not performed by the driver, the vehicle seat control system subsequently determines whether a braking operation of the brake pedal 64 is performed by the driver.

In the above fifth embodiment, the vehicle seat control system is configured so that the movable side support portions 26 in the vehicle seat 12 are pivoted in the closing or bending direction when it is detected that a braking operation of the brake pedal 64 is performed by a driver, or it is detected that a shift down operation of the shift lever 66 is performed by the driver. However, the vehicle seat control system may be configured so that the movable side support portions 26 in the vehicle seat 12 are pivoted in the closing or bending direction when it is detected that a braking operation of the brake pedal 64 and a shift down operation of the shift lever 66 are performed by a driver.

In addition, the modification of the fifth embodiment may further include the deceleration sensor 40 of the above-described second embodiment of the invention, and may be configured so that the movable side support portions 26 in the vehicle seat 12 are pivoted in the closing or bending direction provided that a braking operation of the brake pedal 64 performed by a driver is detected, or a shift down operation of the shift lever 66 performed by the driver is detected, and that it is determined that the detection value of the deceleration in the vehicle longitudinal direction that occurs to the vehicle 60 is greater than the predetermined reference value γ.

Next, referring to FIGS. 13 and 14, a sixth embodiment of the invention will be described.

Figure 13:
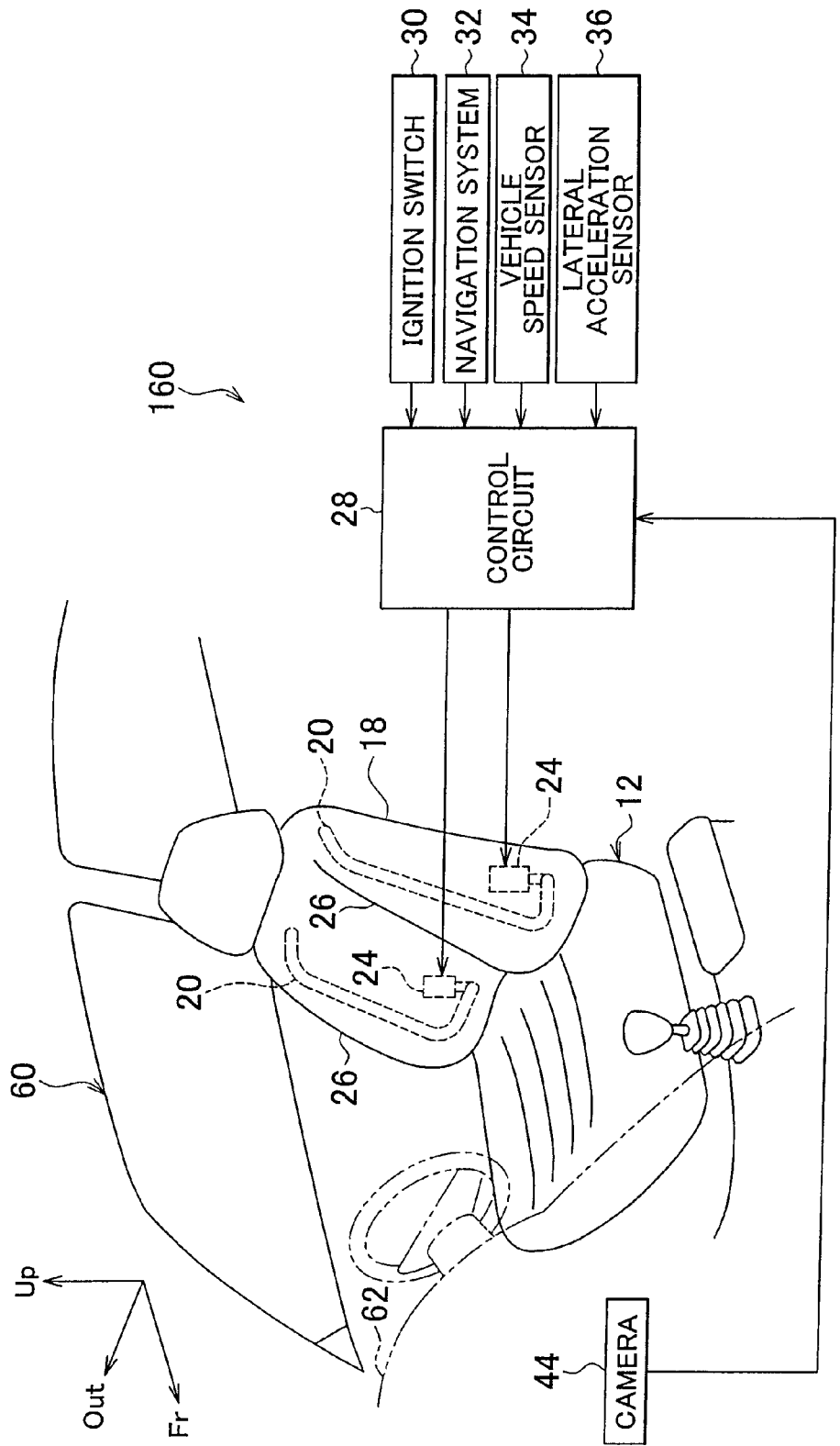
FIG. 13 is a block diagram showing an overall configuration of a vehicle seat control system according to a sixth embodiment of the invention.

FIG. 13 shows a block diagram showing an overall configuration of a vehicle seat control system 160 according to the sixth embodiment of the invention. FIG. 14 shows a flow chart illustrating operation of the vehicle seat control system 160 according to the sixth embodiment of the invention.

Figure 14:
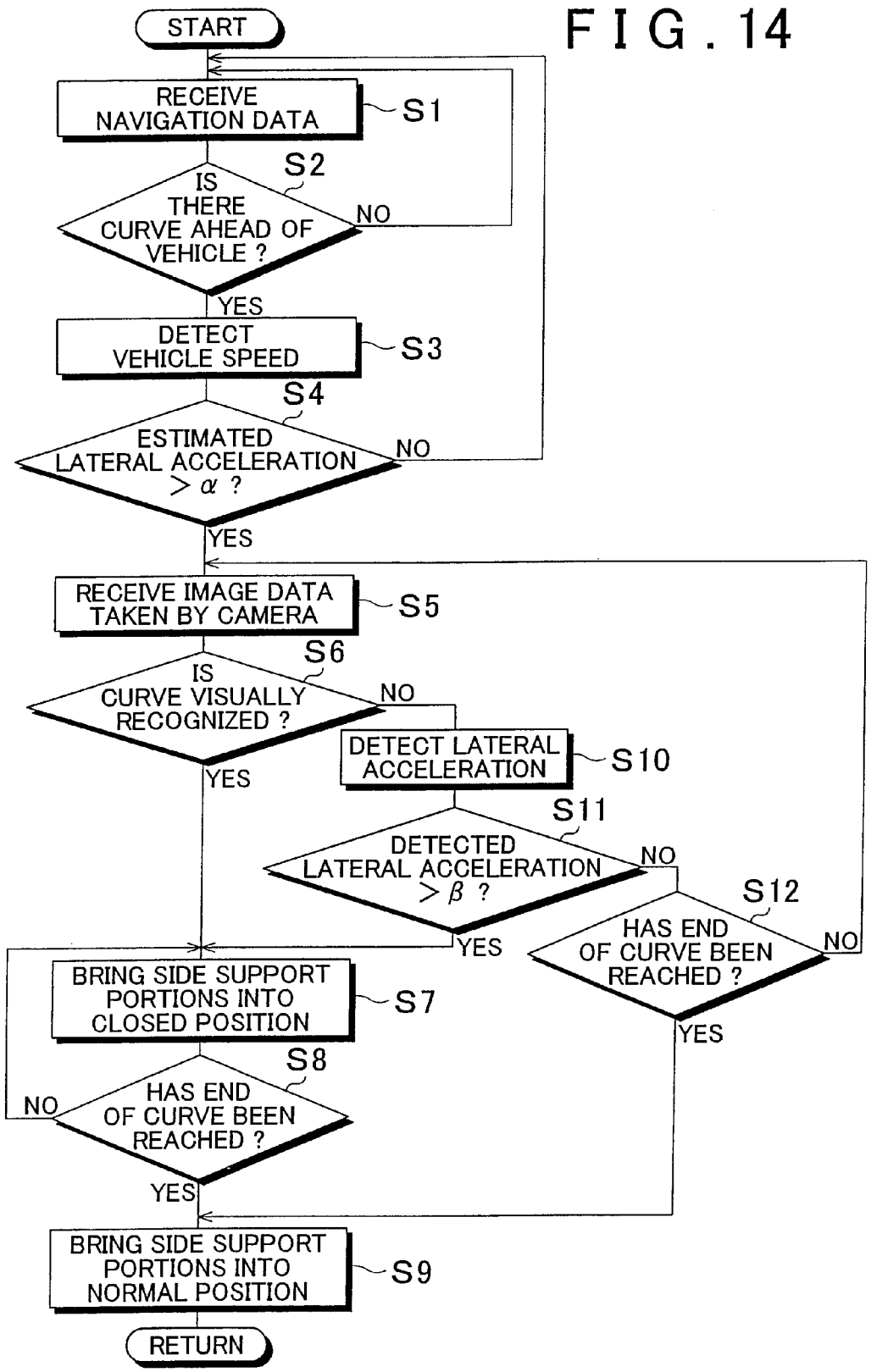
FIG. 14 is a flow chart illustrating operation of the vehicle seat control system according to the sixth embodiment of the invention.

The vehicle seat control system 160 according to the sixth embodiment of the invention is such that a camera 44 (pre-turning action detection section) is provided instead of the pedal operation detection unit 38 in the vehicle seat control system 10 according to the first embodiment of the invention, and that the control circuit 28 is designed to perform a programmed process shown in FIG. 14. Thus, in the sixth embodiment of the invention, the other components are the same as those of the first embodiment described above. Hence, the same components as those of the first embodiment are designated by the same reference numerals as those of the first embodiment, and description thereof is omitted.

In the vehicle seat control system 160 according to the sixth embodiment of the invention, the camera 44 is disposed at an appropriate location, such as in an instrument panel 62 or a ceiling portion in the passenger compartment, and is designed to shoot the face of a driver, and output the image data to the control circuit 28.

In the vehicle seat control system 160 according to the sixth embodiment of the invention, connected to the control circuit 28 are the ignition switch 30, the navigation system 32, the vehicle speed sensor 34, the lateral acceleration sensor 36, and the camera 44. The control circuit 28 is configured to receive data output from the above-described navigation system 32, the signals output from the vehicle speed sensor 34 and the lateral acceleration sensor 36, and data output from the camera 44, and to operate the drive motors 24. Operation of the control circuit 28 will be described in detail later.

Next, operation of the vehicle seat control system 160 according to the sixth embodiment of the invention will be described.

In the vehicle seat control system 160 according to the sixth embodiment of the invention, the processes of steps S5 and S6 are changed as described below from those performed by the above-described vehicle seat control system 10 according to the first embodiment of the invention. In the vehicle seat control system 160 according to the sixth embodiment of the invention, the processes other than the processes described below are the same as those of the above-described first embodiment, and therefore, the same processes as those of the first embodiment are designated by the same reference numerals as those of the first embodiment, and description thereof is omitted.

In the vehicle seat control system 160 according to the sixth embodiment of the invention, when the control circuit 28, before the vehicle 60 turns the curve ahead of the vehicle 60, determines that the estimation value of the lateral acceleration that is expected to occur to the vehicle 60 while the vehicle 60 is turning the curve ahead of the vehicle is greater than the predetermined reference value α (YES in step S4), the control circuit 28 receives the image data output from the camera 44 (step S5).

Subsequently, the control circuit 28 determines whether the driver varies the line-of-sight direction or the orientation of his/her face and visually recognizes a curve ahead of the vehicle 60, based on the image data output from the camera 44 (step S6).

When the driver varies the line-of-sight direction or the orientation of his/her face and visually recognizes the curve ahead of the vehicle 60 before the vehicle 60 turns the curve, the control circuit 28 determines that the driver has varied the line-of-sight direction or the orientation of his/her face and has visually recognized the curve ahead of the vehicle 60, based on the image data output from the camera 44 (YES in step S6). The control circuit 28 then operates the drive motors 24, and pivots the movable side support portions 26 in the closing or bending direction to bring them into a closed position (step S7).

In this way, in the vehicle seat control system 160 according to the sixth embodiment of the invention, when a driver varies the line-of-sight direction or the orientation of his/her face and visually recognizes a curve ahead of the vehicle 60 before the vehicle 60 turns the curve, the movable side support portions 26 are pivoted in the closing or bending direction to restrain the driver in preparation for turning the curve.

Next, operation and effects of the vehicle seat control system 160 according to the sixth embodiment of the invention will be described.

As described in detail above, with the vehicle seat control system 160 according to the sixth embodiment of the invention, before the vehicle 60 turns a curve ahead of the vehicle 60, whether a visual recognition action is taken by a driver before the vehicle 60 turns the curve is determined (step S6) in addition to the lateral acceleration that is expected to occur to the vehicle 60 while the vehicle 60 is turning the curve ahead of the vehicle 60, and, depending on the determination results, the movable side support portions 26 in the vehicle seat 12 are pivoted in the closing or bending direction. As a result, it is possible to restrain the driver at a more proper time that the driver feels appropriate as compared to the case where the movable side support portions 26 in the vehicle seat 12 are pivoted in the closing or bending direction depending only on the result of estimating lateral acceleration (that is, the result of the process of step S4).

In particular, with the vehicle seat control system 160 according to the sixth embodiment of the invention, it is possible to restrain a driver at an earlier time by detecting a visual recognition action taken before an actual transition to a pre-turning action taken before the vehicle turns a curve, such as the braking operation or the shift down operation. As a result, the driver feels an even greater sense of unity with the vehicle 60, and it is therefore possible to improve the drive feeling of the driver.

Next, a modification of the vehicle seat control system 160 according to the sixth embodiment of the invention will be described.

In the above sixth embodiment, the vehicle seat control system is configured so that the movable side support portions 26 in the vehicle seat 12 are pivoted in the closing or bending direction when it is detected that a driver varies the line-of-sight direction or the orientation of his/her face and visually recognizes the curve ahead of the vehicle 60 before the vehicle 60 turns the curve. However, the vehicle seat control system may be configured so that the movable side support portions 26 in the vehicle seat 12 are pivoted in the closing or bending direction when it is detected that a driver varies the line-of-sight direction or the orientation of his/her face and visually recognizes the curve ahead of the vehicle 60 before the vehicle 60 turns the curve, when it is detected that a braking operation of the brake pedal 64 is performed by a driver, or when it is detected that the transmission is manually shifted down by a driver.

Alternatively, the vehicle seat control system may be configured so that the movable side support portions 26 in the vehicle seat 12 are pivoted in the closing or bending direction, provided that it is detected that a driver varies the line-of-sight direction or the orientation of his/her face and visually recognizes the curve ahead of the vehicle 60 before the vehicle 60 turns the curve, and, in addition, that it is detected that a braking operation of the brake pedal 64 is performed by the driver or it is detected that the transmission is manually shifted down by the driver.

Alternatively, the vehicle seat control system may be configured so that the movable side support portions 26 in the vehicle seat 12 are pivoted in the closing or bending direction when it is detected that a driver varies the line-of-sight direction or the orientation of his/her face and visually recognizes the curve ahead of the vehicle 60 before the vehicle 60 turns the curve, that a braking operation of the brake pedal 64 is performed by the driver, and that the transmission is manually shifted down by the driver.

Next, referring to FIGS. 15 to 17, a seventh embodiment of the invention will be described.

Figure 15:
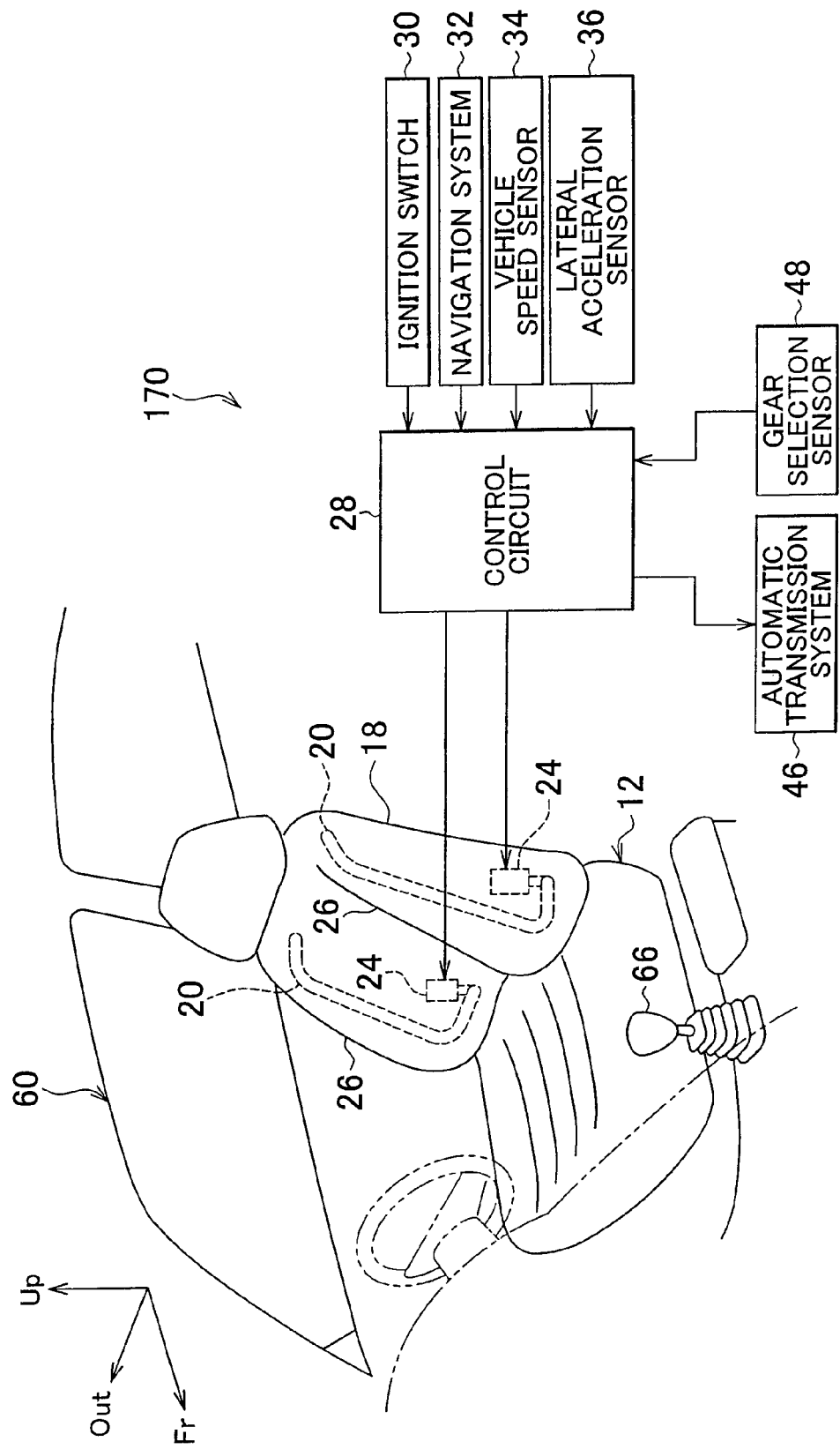
FIG. 15 is a block diagram showing an overall configuration of a vehicle seat control system according to a seventh embodiment of the invention.

FIG. 15 shows a block diagram showing an overall configuration of a vehicle seat control system 170 according to the seventh embodiment of the invention. FIGS. 16 and 17 show flow charts illustrating operation of the vehicle seat control system 170 according to the seventh embodiment of the invention.

Figure 16:
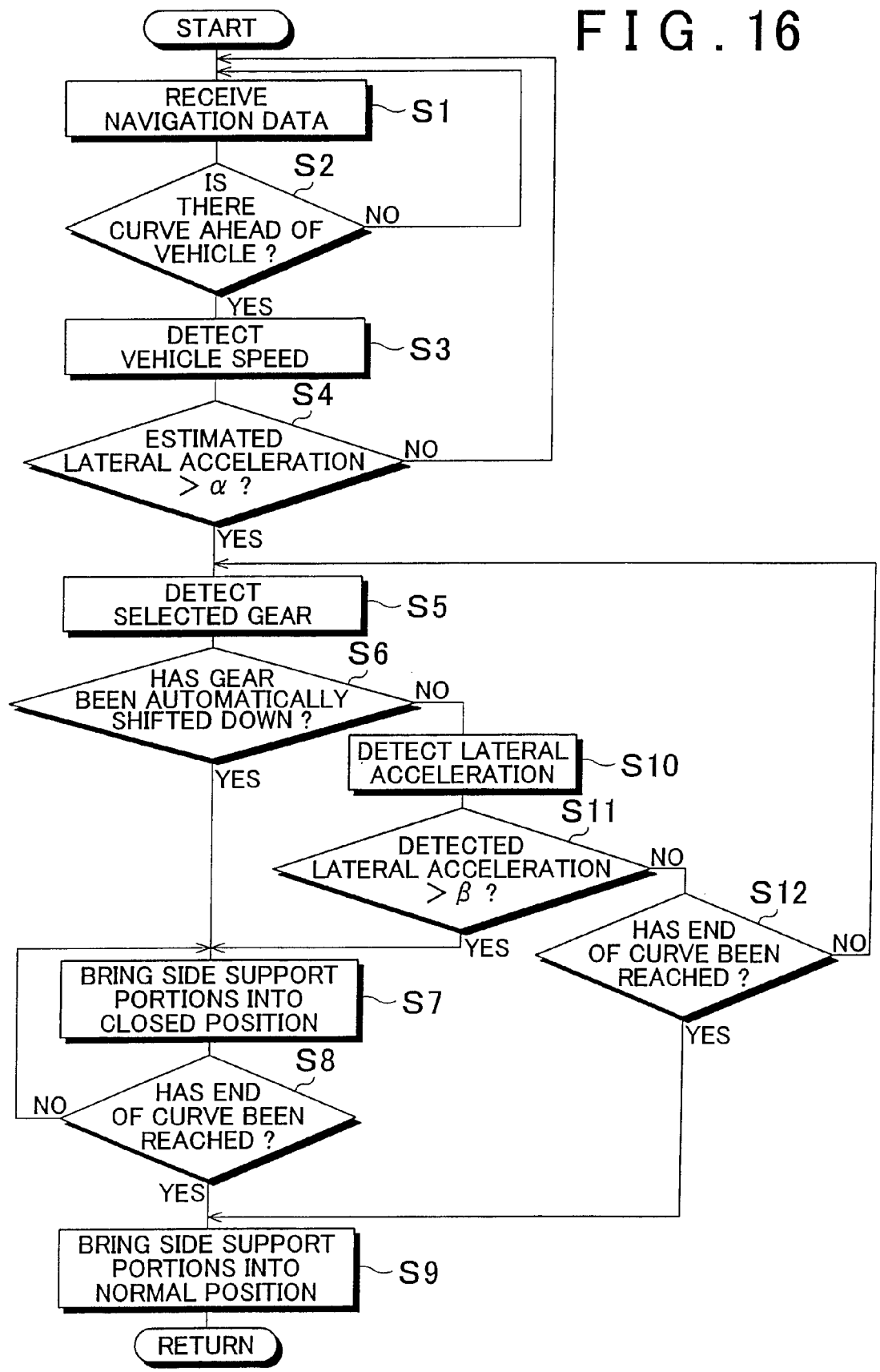
FIG. 16 is a flow chart illustrating operation of the vehicle seat control system according to the seventh embodiment of the invention.
Figure 17:
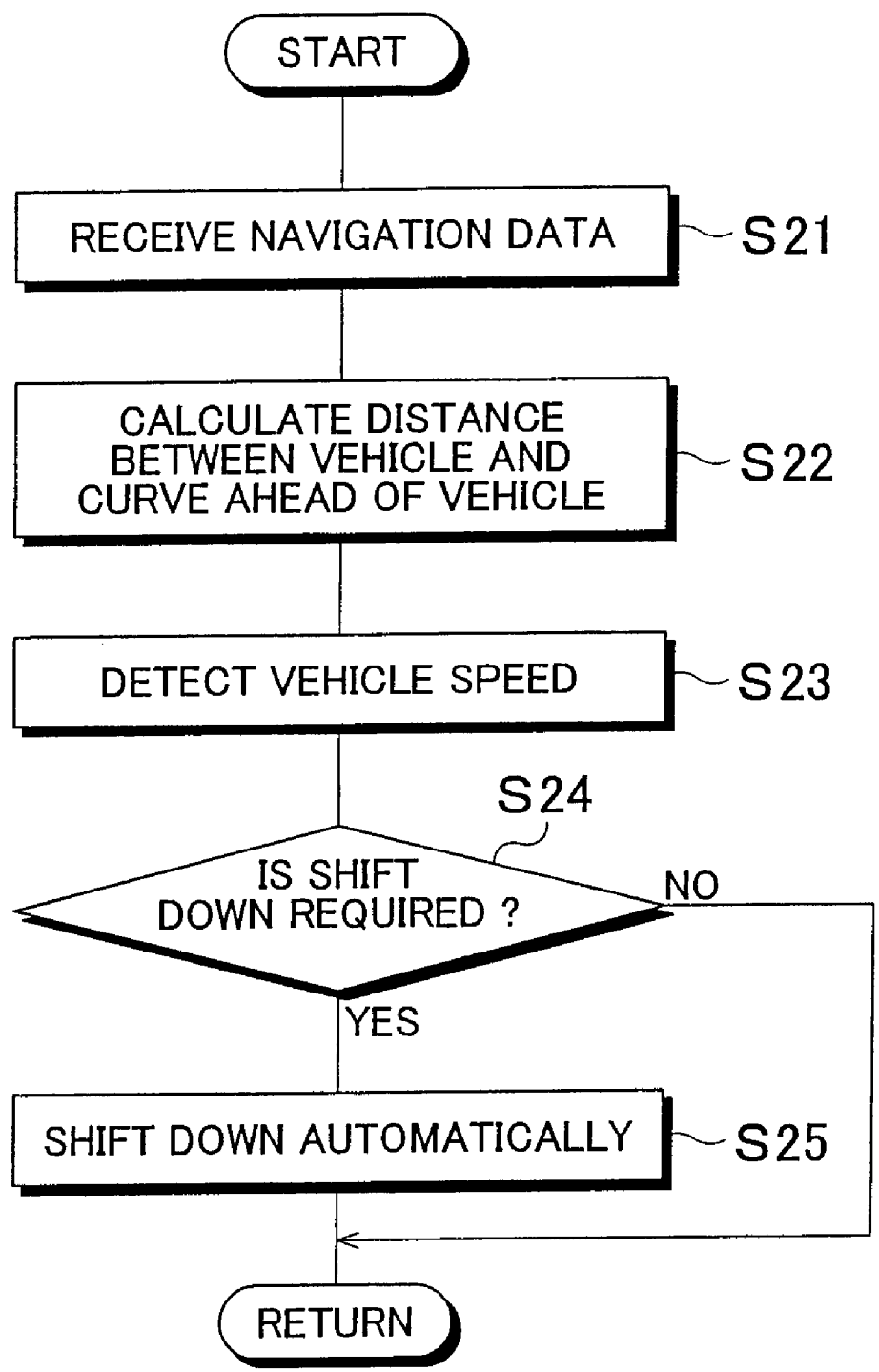
FIG. 17 is a flow chart illustrating operation of the vehicle seat control system according to the seventh embodiment of the invention.

The vehicle seat control system 170 according to the seventh embodiment of the invention is such that an automatic transmission system 46 and a gear selection sensor 48 (shift down detection section) are provided instead of the pedal operation detection unit 38 in the vehicle seat control system 10 according to the first embodiment of the invention, and that the control circuit 28 is designed to perform programmed processes shown in FIGS. 16 and 17. Thus, in the seventh embodiment of the invention, the other components are the same as those of the first embodiment described above. Hence, the same components as those of the first embodiment are designated by the same reference numerals as those of the first embodiment, and description thereof is omitted.

In the vehicle seat control system 170 according to the seventh embodiment of the invention, the automatic transmission system 46 is configured to be able to automatically shift a transmission of the vehicle 60 in response to the command signal provided from the control circuit 28 without the need for the driver to perform a shifting operation of the shift lever 66. The gear selection sensor 48 is configured to detect the selected gear of the transmission shifted by the automatic transmission system 46 and output a signal corresponding to the selected gear to the control circuit 28.

In the vehicle seat control system 170 according to the seventh embodiment of the invention, connected to the control circuit 28 are the ignition switch 30, the navigation system 32, the vehicle speed sensor 34, the lateral acceleration sensor 36, the automatic transmission system 46, and the gear selection sensor 48. The control circuit 28 is configured to receive data output from the above-described navigation system 32, and the signal output from the vehicle speed sensor 34, and to operate the automatic transmission system 46. In addition, the control circuit 28 is configured to receive data output from the above-described navigation system 32, and the signals output from the vehicle speed sensor 34, the lateral acceleration sensor 36, and the gear selection sensor 48, and to operate the drive motors 24. Operation of the control circuit 28 will be described in detail later.

Next, operation of the vehicle seat control system 170 according to the seventh embodiment of the invention will be described.

In the vehicle seat control system 170 according to the seventh embodiment of the invention, the processes of steps S5 and S6 are changed as described below from those performed by the above-described vehicle seat control system 10 according to the first embodiment of the invention. The control circuit 28 has an additional processing section in addition to the processing section for performing the processes of the above-described steps S1 to S12, and is configured to be able to perform the programmed process shown in FIG. 17 in the additional processing section in parallel with the programmed process shown in FIG. 16. In the vehicle seat control system 170 according to the seventh embodiment of the invention, the processes other than the processes described below are the same as those of the above-described first embodiment, and therefore, the same processes as those of the first embodiment are designated by the same reference numerals as those of the first embodiment, and description thereof is omitted.

The programmed process shown in FIG. 17 that is performed by the control circuit 28 will be first described. When a driver operates an engine starting operation part (an ignition key or an engine starting button, for example) provided in the vehicle 60, the ignition switch 30 outputs an engine start-up signal to the control circuit 28. When receiving the engine start-up signal output from the ignition switch 30, the control circuit 28 starts the programmed process shown in FIG. 17 in addition to the programmed process shown in FIG. 16.

When starting the programmed process shown in FIG. 17, the control circuit 28 first receives the data output from the navigation system 32, that is, the host vehicle-position data, and, if there is a curve ahead on the road, receives the data concerning the position and the curvature radius of the curve (step S21). The control circuit 28 then calculates or finds the host vehicle-position data output from the navigation system 32, and the distance between the position of the host vehicle and the curve ahead on the road on which the vehicle 60 is running, based on the position data of the curve ahead on the road (step S22). In this embodiment, the process of step S22 performed by the control circuit 28 may be regarded as the distance determination section of the invention.

Subsequently, the control circuit 28 detects the speed of the vehicle 60 before the vehicle 60 turns the curve by detecting the pulse signal output from the vehicle speed sensor 34 (step S23). Thereafter, the control circuit 28 determines whether it is required to shift down the transmission before the vehicle 60 turns the curve (step S24), based on the distance between the host vehicle position and the curve ahead of the vehicle that is calculated in step S22, on the speed of the vehicle 60 before it turns the curve that is detected in step S23, and on the data concerning the curvature radius of the curve that is received in step S21.

When the curvature radius of the curve ahead of the vehicle 60 is large, and/or when the speed of the vehicle 60 before the vehicle 60 turns the curve is low, for example, the control circuit 28 determines that there is no need to shift down the transmission before the vehicle 60 turns the curve (NO in step S24). The control circuit 28 then returns to the process of step S21.

On the other hand, when the curvature radius of the curve ahead of the vehicle 60 is small, and/or when the speed of the vehicle 60 before the vehicle 60 turns the curve is high, for example, the control circuit 28 determines that it is required to shift down the transmission before the vehicle 60 turns the curve (YES in step S24). The control circuit 28 then outputs a command signal to the automatic transmission system 46 (step S25). When receiving the command signal from the control circuit 28, the automatic transmission system 46 automatically shifts down the transmission of the vehicle in response to the reception of the signal.

Thus, with the vehicle seat control system 170 according to the seventh embodiment of the invention, when the curvature radius of the curve ahead of the vehicle 60 is small, and/or when the speed of the vehicle 60 before the vehicle 60 turns the curve is high, for example, the transmission of the vehicle 60 is automatically shifted down by the automatic transmission system 46 without the need for the driver to perform a shifting operation of the shift lever 66. When the transmission of the vehicle 60 is automatically shifted down by the automatic transmission system 46, a signal corresponding to the selected gear of the transmission is output from the gear selection sensor 48 to the control circuit 28. In this embodiment, the process of step S24 performed by the control circuit 28 may be regarded as the determination section of the invention, and the process of step S25 performed by the control circuit 28 may be regarded as the automatic shift control section.

In the vehicle seat control system 170 according to the seventh embodiment of the invention, the control circuit 28 performs the programmed process shown in FIG. 16 in parallel with the above-described processes of steps S21 to S25. When the control circuit 28, before the vehicle 60 turns the curve ahead of the vehicle 60, determines that the estimation value of the lateral acceleration that is expected to occur to the vehicle 60 while the vehicle 60 is turning the curve ahead of the vehicle 60 is greater than the predetermined reference value α (YES in step S4), the control circuit 28 detects a signal output from the gear selection sensor 48 (step S5).

Subsequently, the control circuit 28 determines whether the transmission is shifted down by the automatic transmission system 46, based on the signal output from the gear selection sensor 48 (step S6).

When the transmission is shifted down by the automatic transmission system 46 before the vehicle 60 turns the curve as described above, the control circuit 28 determines that the transmission has been shifted down by the automatic transmission system 46, based on the signal output from the gear selection sensor 48 (YES in step S6). The control circuit 28 then operates the drive motors 24, and pivots the movable side support portions 26 in the closing or bending direction to bring them into a closed position (step S7).

In this way, with the vehicle seat control system 170 according to the seventh embodiment of the invention, in the case where the curvature radius of the curve ahead of the vehicle 60 is small, and/or where the speed of the vehicle 60 before the vehicle 60 turns the curve is high, for example, when the transmission is shifted down by the automatic transmission system 46 before the vehicle 60 turns the curve to decelerate the vehicle 60, the movable side support portions 26 are pivoted in the closing or bending direction to restrain the driver in preparation for turning the curve.

Next, operation and effects of the vehicle seat control system 170 according to the seventh embodiment of the invention will be described.

As described in detail above, with the vehicle seat control system 170 according to the seventh embodiment of the invention, before the vehicle 60 turns a curve ahead of the vehicle 60, whether a shift down operation is performed by the automatic transmission system 46 before the vehicle 60 turns the curve is determined (step S6) in addition to the lateral acceleration that is expected to occur to the vehicle 60 while the vehicle 60 is turning the curve ahead of the vehicle 60, and, depending on the determination results, the movable side support portions 26 in the vehicle seat 12 are pivoted in the closing or bending direction. As a result, it is possible to restrain the driver at a more proper time that the driver feels appropriate as compared to the case where the movable side support portions 26 in the vehicle seat 12 are pivoted in the closing or bending direction depending only on the result of estimating lateral acceleration (that is, the result of the process of step S4).

In particular, with the vehicle seat control system 170 according to the seventh embodiment of the invention, a driver is surely restrained when the automatic transmission system 46 shifts down the transmission, and it is therefore possible to restrain the driver at a more proper time that the driver feels appropriate. In addition, the driver is restrained at an earlier time by using the event that the transmission is shifted down by the automatic transmission system 46 as a trigger for a pivoting movement of the movable side support portions 26, so that the driver feels an even greater sense of unity with the vehicle 60, and it is therefore possible to improve the drive feeling of the driver.

With the vehicle seat control system 170 according to the seventh embodiment of the invention, the automatic transmission system 46 automatically shifts down the transmission before the vehicle 60 turns the curve, whereby the driver is notified in advance of the fact that there is a curve ahead of the vehicle, which ensures that the driver recognizes the curve ahead of the vehicle.

Next, a modification of the vehicle seat control system 170 according to the seventh embodiment of the invention will be described.

In the above seventh embodiment, the vehicle seat control system is configured so that the movable side support portions 26 in the vehicle seat 12 are pivoted in the closing or bending direction when it is detected that the transmission is automatically shifted down by the automatic transmission system 46. However, the vehicle seat control system may be configured so that the movable side support portions 26 in the vehicle seat 12 are pivoted in the closing or bending direction when it is detected that the transmission is automatically shifted down by the automatic transmission system 46, that a braking operation of the brake pedal 64 is performed by a driver, or that the transmission is manually shifted down by the driver.

Alternatively, the vehicle seat control system may be configured so that the movable side support portions 26 in the vehicle seat 12 are pivoted in the closing or bending direction when it is detected that a braking operation of the brake pedal 64 is performed by a driver and that the transmission is automatically shifted down by the automatic transmission system 46. The vehicle seat control system may be designed so that the degree of restraint provided by the side support portions is selected from multiple levels in accordance with the acceleration that is expected to occur to the vehicle. When the degree of restraint is selected from the multiple levels, the driver feels an even greater sense of unity with the vehicle, and it is therefore possible to improve the drive feeling of the driver.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the appended claims.

The invention claimed is:

1. A vehicle seat control system comprising:
   a vehicle seat having a restraint portion that is provided so as to be movable relative to a seat body portion and of which a degree of restraint on a seated occupant is variable;
   a driving device for moving the restraint portion relative to the seat body portion in an occupant restraining direction;
   a curvature radius detection system for detecting a curvature radius of a curve ahead on a road on which the vehicle is running;
   a speed sensing part for sensing a speed of the vehicle;
   a pre-turning action detection section for detecting a pre-turning action taken before the vehicle turns the curve;
   an estimation section for estimating lateral acceleration that is expected to occur to the vehicle while the vehicle is turning the curve ahead of the vehicle, based on the curvature radius of the curve ahead of the vehicle that is detected by the curvature radius detection system, and on the speed of the vehicle before the vehicle turns the curve ahead of the vehicle that is sensed by the speed sensing part, the estimation section being configured to determine whether the estimated lateral acceleration is greater than a predetermined reference lateral-acceleration value;

a drive control section for controlling the driving device so as to move the restraint portion relative to the seat body portion in the occupant restraining direction when the estimated lateral acceleration is greater than the predetermined reference lateral-acceleration value, and the pre-turning action is detected by the pre-turning action detection section; and a deceleration detection section for detecting deceleration of the vehicle in a vehicle longitudinal direction, wherein the drive control section controls the driving device so that the restraint portion is moved relative to the seat body portion in the occupant restraining direction when the lateral acceleration of the vehicle estimated by the estimation section is greater than the predetermined reference lateral-acceleration value, the pre-turning action is detected by the pre-turning action detection section, and the deceleration of the vehicle in the vehicle longitudinal direction detected by the deceleration detection section is greater than a predetermined reference deceleration value.

2. The vehicle seat control system according to claim 1, wherein
the pre-turning action detection section detects a deceleration operation for decelerating the vehicle as the pre-turning action.

3. The vehicle seat control system according to claim 2, wherein
the pre-turning action detection section detects a braking operation of the vehicle as the deceleration operation.

4. The vehicle seat control system according to claim 2, wherein
the pre-turning action detection section detects a shift down operation of the transmission of the vehicle as the deceleration operation.

5. The vehicle seat control system according to claim 1, wherein
the pre-turning action detection section detects, as the pre-turning action, a visual recognition action taken when the occupant or a driver visually recognizes the curve ahead of the vehicle.

6. A vehicle seat control system comprising:
a vehicle seat having a restraint portion that is provided so as to be movable relative to a seat body portion and of which a degree of restraint on a seated occupant is variable;
a driving device for moving the restraint portion relative to the seat body portion in an occupant restraining direction;
a curvature radius detection system for detecting a curvature radius of a curve ahead on a road on which the vehicle is running;
a speed sensing part for sensing a speed of the vehicle;
shift down detection section for detecting an event that a transmission of the vehicle is shifted down by shifting device;
an estimation section for estimating lateral acceleration that is expected to occur to the vehicle while the vehicle is turning the curve ahead of the vehicle, based on the curvature radius of the curve ahead of the vehicle that is detected by the curvature radius detection system, and on the speed of the vehicle before the vehicle turns the curve ahead of the vehicle that is sensed by the speed sensing part, the estimation section being configured to determine whether the estimated lateral acceleration is greater than a predetermined reference lateral-acceleration value;

a drive control section for controlling the driving device so as to move the restraint portion relative to the seat body portion in the occupant restraining direction when the estimated lateral acceleration is greater than the predetermined reference lateral-acceleration value, and the event that the transmission is shifted down is detected based on a result of detection performed by the shift down detection section; and a deceleration detection section for detecting deceleration of the vehicle in the vehicle longitudinal direction, wherein the drive control section controls the driving device so that the restraint portion is moved relative to the seat body portion in the occupant restraining direction when the lateral acceleration of the vehicle estimated by the estimation section is greater than the predetermined reference lateral-acceleration value, the event that the transmission is shifted down is detected based on a result of detection performed by the shift down detection section, and the deceleration of the vehicle in the vehicle longitudinal direction detected by the deceleration detection section is greater than a predetermined reference deceleration value.

7. The vehicle seat control system according to claim 6, wherein
the shifting device includes:
a distance detection section for detecting a distance between a vehicle position on the road on which the vehicle is running and the curve ahead of the vehicle;
an automatic transmission system capable of shifting down the transmission;
a determination section for determining whether it is required to shift down the transmission, based on the distance detected by the distance detection section, the curvature radius of the curve ahead of the vehicle that is detected by the curvature radius detection system, and the speed of the vehicle before the vehicle turns the curve ahead of the vehicle that is sensed by the speed sensing part; and
an automatic shift control section for controlling the automatic transmission system to shift down the transmission when the determination section determines that it is required to shift down the transmission.

8. A method of controlling a vehicle seat having a restraint portion that is provided so as to be movable relative to a seat body portion and of which a degree of restraint on a seated occupant is variable, the method comprising:
moving, via a driving device, the restraint portion relative to the seat body portion in an occupant restraining direction;
detecting, via a curvature radius detection system, a curvature radius of a curve ahead on a road on which the vehicle is running;
sensing, via a speed sensing part, a speed of the vehicle;
detecting, via a pre-turning action detection section, a pre-turning action taken before the vehicle turns the curve;
estimating, via an estimation section, lateral acceleration that is expected to occur to the vehicle while the vehicle is turning the curve ahead of the vehicle, based on the detected curvature radius of the curve ahead of the vehicle, and on the sensed speed of the vehicle before the vehicle turns the curve ahead of the vehicle;

determining, via the estimation section, whether the estimated lateral acceleration of the vehicle is greater than a predetermined reference lateral-acceleration value;

moving, via a drive control section, the restraint portion relative to the seat body portion in the occupant restraining direction when the estimated lateral acceleration is greater than the predetermined reference lateral-acceleration value, and the pre-turning action is detected; and detecting, via a deceleration detection section, deceleration of the vehicle in a vehicle longitudinal direction, wherein the restraint portion is moved relative to the seat body portion in the occupant restraining direction when the lateral acceleration is greater than the predetermined reference lateral-acceleration value, the pre-turning action is detected, and the deceleration of the vehicle in the vehicle longitudinal direction is greater than a predetermined reference deceleration value.

9. A method of controlling a vehicle seat having a restraint portion that is provided so as to be movable relative to a seat body portion and of which a degree of restraint on a seated occupant is variable, the method comprising:

moving, via a driving device, the restraint portion relative to the seat body portion in an occupant restraining direction;

detecting, via a curvature radius detection system, a curvature radius of a curve ahead on a road on which the vehicle is running;

sensing, via a speed sensing part, a speed of the vehicle;

detecting, via a pre-turning action detection section, an event that a transmission of the vehicle is shifted down by a shifting device;

estimating, via an estimation section, lateral acceleration that is expected to occur to the vehicle while the vehicle is turning the curve ahead of the vehicle, based on the detected curvature radius of the curve ahead of the vehicle, and on the sensed speed of the vehicle before the vehicle turns the curve ahead of the vehicle;

determining, via the estimation section, whether the estimated lateral acceleration of the vehicle is greater than a predetermined reference lateral-acceleration value;

moving, via a drive control section, the restraint portion relative to the seat body portion in the occupant restraining direction when the estimated lateral acceleration is greater than the predetermined reference lateral-acceleration value, and the event that the transmission is shifted down is detected; and detecting, via a deceleration detection section, deceleration of the vehicle in a vehicle longitudinal direction, wherein the restraint portion is moved relative to the seat body portion in the occupant restraining direction when the lateral acceleration is greater than the predetermined reference lateral-acceleration value, the event that the transmission is shifted down is detected, and the deceleration of the vehicle in the vehicle longitudinal direction is greater than a predetermined reference deceleration value.

10. A vehicle seat control system comprising:

a vehicle seat having a restraint portion that is provided so as to be movable relative to a seat body portion and of which a degree of restraint on a seated occupant is variable;

a driving device for moving the restraint portion relative to the seat body portion in an occupant restraining direction;

a curvature radius detection system for detecting a curvature radius of a curve ahead on a road on which the vehicle is running;

a speed sensing part for sensing a speed of the vehicle;

a pre-turning action detection section for detecting a pre-turning action taken before the vehicle turns the curve;

an estimation section for estimating lateral acceleration that is expected to occur to the vehicle while the vehicle is turning the curve ahead of the vehicle, based on the curvature radius of the curve ahead of the vehicle that is detected by the curvature radius detection system, and on the speed of the vehicle before the vehicle turns the curve ahead of the vehicle that is sensed by the speed sensing part; and a drive control section for controlling the driving device so as to move the restraint portion relative to the seat body portion in the occupant restraining direction when the lateral acceleration of the vehicle that is estimated by the estimation section is greater than a predetermined reference lateral-acceleration value, and the pre-turning action is detected by the pre-turning action detection section;

wherein the pre-turning action detection section detects as the pre-turning action one or two of a deceleration operation for decelerating the vehicle, a camera-based visual recognition action taken when the occupant or a driver visually recognizes the curve ahead of the vehicle, a braking operation of the vehicle, and a shift down operation of a transmission of the vehicle.

* * * * *